United States Patent
Jeung et al.

(10) Patent No.: US 9,916,119 B2
(45) Date of Patent: Mar. 13, 2018

(54) MULTIPLE DISPLAY METHOD WITH MULTIPLE COMMUNICATION TERMINALS, MACHINE-READABLE STORAGE MEDIUM AND COMMUNICATION TERMINAL

(71) Applicant: Samsung Electronics Co., Ltd., Gyeonggi-do (KR)

(72) Inventors: Ji-Hong Jeung, Seoul (KR); Sung-Jin Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 13 days.

(21) Appl. No.: 13/900,836

(22) Filed: May 23, 2013

(65) Prior Publication Data
US 2013/0314302 A1    Nov. 28, 2013

(30) Foreign Application Priority Data
May 25, 2012    (KR) .......................... 10-2012-0055883

(51) Int. Cl.
*G09G 5/00*    (2006.01)
*G06F 3/14*    (2006.01)

(52) U.S. Cl.
CPC .......... *G06F 3/1423* (2013.01); *G06F 3/1454* (2013.01); *G09G 2354/00* (2013.01); *G09G 2356/00* (2013.01); *G09G 2370/04* (2013.01); *G09G 2370/16* (2013.01)

(58) Field of Classification Search
CPC . G06F 3/1423; G06F 3/1454; G09G 2354/00; G09G 2356/00; G09G 2370/04; G09G 2370/16

USPC .................... 345/156–184; 178/18.01–18.09, 178/19.01–19.04, 20.01
See application file for complete search history.

(56) References Cited

U.S. PATENT DOCUMENTS

| | | | |
|---|---|---|---|
| 2005/0168399 A1* | 8/2005 | Palmquist | ...................... 345/1.1 |
| 2007/0085759 A1* | 4/2007 | Lee | ........................ G06F 1/1616 345/1.1 |
| 2009/0061942 A1 | 3/2009 | Smith et al. | |

(Continued)

FOREIGN PATENT DOCUMENTS

| | | |
|---|---|---|
| CN | 1894738 A | 1/2007 |
| CN | 1949905 A | 4/2007 |

(Continued)

OTHER PUBLICATIONS

Chinese Search Report dated May 4, 2017.
European Search Report dated Jan. 9, 2017.

*Primary Examiner* — Insa Sadio
(74) *Attorney, Agent, or Firm* — Cha & Reiter, LLC

(57) ABSTRACT

A multiple display method to be performed by two or more communication terminals to expand visibility is provided. A first communication terminal establishes a wireless connection with a second communication terminal, receives device information of the second communication terminal, generates first screen data based on the device information for configuring a first screen of the first communication terminal and second screen data for configuring a second screen of the second communication terminal in association with the first screen. The second screen data is transmitted to the second communication terminal.

18 Claims, 19 Drawing Sheets

(56) References Cited

U.S. PATENT DOCUMENTS

| | | |
|---|---|---|
| 2010/0225664 A1 | 9/2010 | Ogasawara |
| 2010/0328447 A1 | 12/2010 | Watson |
| 2011/0143769 A1 | 6/2011 | Jones et al. |
| 2011/0148935 A1* | 6/2011 | Arrasvuori .................... 345/676 |
| 2011/0242033 A1* | 10/2011 | Kim et al. .................... 345/173 |
| 2011/0252317 A1* | 10/2011 | Keranen et al. ............. 715/702 |
| 2011/0307829 A2 | 12/2011 | Lazaridis |
| 2012/0060109 A1 | 3/2012 | Han et al. |
| 2012/0062475 A1* | 3/2012 | Locker et al. ................ 345/173 |
| 2012/0173744 A1 | 7/2012 | Lee et al. |

FOREIGN PATENT DOCUMENTS

| | | |
|---|---|---|
| CN | 102298917 A | 12/2011 |
| KR | 10-0755851 B1 | 9/2007 |
| KR | 10-2011-0027246 A | 3/2011 |
| KR | 10-2012-0025929 A | 3/2012 |

* cited by examiner

US 9,916,119 B2

MULTIPLE DISPLAY METHOD WITH MULTIPLE COMMUNICATION TERMINALS, MACHINE-READABLE STORAGE MEDIUM AND COMMUNICATION TERMINAL

CLAIM OF PRIORITY

This application claims the benefit under 35 U.S.C. §119 (a) from a Korean Patent Application field in the Korean Intellectual Property Office on May 25, 2012, and assigned Serial No. 10-2012-0055883, the entire disclosure of which is incorporated herein by reference in its entirety.

BACKGROUND

Field of the Invention

The present disclosure relates generally to a display method, device, apparatus and/or system. More particularly, although not exclusively, the present invention relates to a method, device, apparatus and/or system for providing a display using a plurality of devices or apparatus (e.g. communication terminals).

Description of the Related Art

In general, electronic devices such as communication terminals have user input units equipped therewith. For example mobile communication terminals typically include keypads. Inputting methods with the keypads are typically divided into button input methods and touchscreen input methods. The touchscreen input methods can include soft keyboard input methods and handwriting recognition methods. The soft keyboard method refers to a method of making inputs with pen-click or finger-click on an input window in a keyboard form popped up on a touchscreen instead of physical keyboard and mouse for portability. The handwriting recognition method refers to a method of recognizing a user's handwriting (i.e., cursiveness) and converting it into a data code.

Such inputs to the communication terminals equipped with touchscreens have selections of applications, such as, for example, a call application, a word (documenting) application, etc. with a menu item selection and inputs of numbers, characters, or symbols necessary to perform an operation in a selected application.

In the latter case, numbers for calling or letters for text messaging are input through the soft keyboard displayed on a touchscreen that has been miniaturized as part of the trend of the miniaturization of mobile terminals. All keys of the soft keyboard displayed on the screen are very small. Thus, there is a high possibility that the user pushes wrong keys, i.e., pushing neighboring keys of the soft keyboard, or more than one key because the keys displayed on the compact-sized touchscreen are too small.

Therefore, a need exists for a new display method to provide a wider screen for the user of the communication terminal.

SUMMARY

The present invention aims to at least partly solve, mitigate, or eliminate at least one of the aforementioned problems and/or shortcomings discussed herein above.

Accordingly, certain embodiments of the present invention provide an apparatus, device (e.g. communication terminal) and method for providing a larger (e.g. wider) screen to a user of the communication terminal, for example larger than provided in a conventional communication terminal.

In accordance with an exemplary aspect of the present invention, there is provided a method (e.g. multiple display method) for a first device (e.g. communication terminal) for providing a display using a first screen of the first device and at least a second screen of a second device, the method comprising the steps of: establishing a connection (e.g. wireless connection) with the second device (e.g. communication terminal); receiving device information of the second device; generating, based on the device information, first screen data for configuring the first screen of the first device and second screen data for configuring the second screen of the second device in association with the first screen (e.g. the combination of the first screen data and the second screen data correspond to at least part of an overall display); and transmitting the second screen data to the second device.

Another exemplary aspect of the present invention provides a computer program comprising instructions arranged, when executed, to implement a method, system, device and/or apparatus in accordance with any aspect or claim disclosed herein. A further exemplary aspect provides machine-readable storage medium storing such a program.

In accordance with another exemplary aspect of the present invention, there is provided a machine-readable storage medium (e.g. non-transitory machine-readable storage medium) having machine executable code stored thereon, which, when executed by hardware (e.g. a processor), will cause the hardware to implement a method, system, device and/or apparatus in accordance with any aspect or claim disclosed herein, for example to perform a multiple display method using multiple communication terminals in accordance with any aspect or claim disclosed herein.

In accordance with still another exemplary aspect of the present invention, there is provided a device or apparatus (e.g. communication terminal) comprising a machine-readable storage medium in accordance with any aspect or claim disclosed herein.

In accordance with yet another exemplary aspect of the present invention, there is provided a first device (e.g. communication terminal) for providing a display using a first screen of the first device and at least a second screen of a second device (e.g. a multiple display), the first device comprising: a communication unit for establishing a connection (e.g. wireless connection) with the second device, receiving device information of the second device, and transmitting second screen data; a display unit for configuring the first screen based on first screen data and displaying the first screen for a user; and a controller for generating, based on the device information, the first screen data for configuring the first screen of the first device and the second screen data for configuring the second screen of the second device in association with the first screen (e.g. the combination of the first screen data and the second screen data correspond to at least part of an overall display).

In accordance with another exemplary aspect of the present invention, there is provided a method for a second device for providing a display using a first screen of a first device and a second screen of the second device, the method comprising the steps of: establishing a connection with the first device; transmitting device information of the second device, thereby allowing the first device to generate, based on the device information, first screen data for configuring the first screen of the first device and second screen data for configuring the second screen of the second device in association with the first screen; receiving the second screen data; configuring the second screen based on the second screen data; and displaying the second screen for a user.

In accordance with another exemplary aspect of the present invention, there is provided a second device for providing a display using a first screen of a first device and a second screen of the second device, the second device comprising: a communication unit for establishing a connection with the first device, for transmitting device information of the second device, thereby allowing the first device to generate, based on the device information, first screen data for configuring the first screen of the first device and second screen data for configuring the second screen of the second device in association with the first screen, and for receiving the second screen data; and a display unit for configuring the second screen based on the second screen data and displaying the second screen for a user.

In accordance with another exemplary aspect of the present invention, there is provided a system for providing a display using a first screen of a first device or terminal and a second screen of a second device or terminal, the system comprising: a first device or terminal in accordance with any aspect or claim disclosed herein; and a second device or terminal in accordance with any aspect or claim disclosed herein.

Other aspects, advantages, and salient features of the invention will become apparent to those skilled in the art from the following detailed description, which, taken in conjunction with the accompanying drawings, disclose exemplary embodiments of the invention.

BRIEF DESCRIPTION OF THE DRAWINGS

The above and other examples and advantages of the present invention will become more apparent to a person of ordinary skill in the art from the detailed exemplary embodiments thereof with reference to the attached drawings in which.

DETAILED DESCRIPTION

The invention now will be described more fully hereinafter with reference to the accompanying drawings, in which illustrative exemplary embodiments of the invention are shown. This invention may, however, be embodied in many different forms and should not be construed as limited to the exemplary embodiments set forth herein; rather, these examples are provided so that this disclosure will be thorough and complete, and will fully convey the scope of the invention to those skilled in the art. Like numbers refer to like elements throughout.

It will be understood by a person of ordinary skill that, although the ordinal terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Descriptions shall be understood as to include any and all combinations of one or more of the associated listed items when the items are described by using the conjunctive term "~ and/or ~," or the like.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
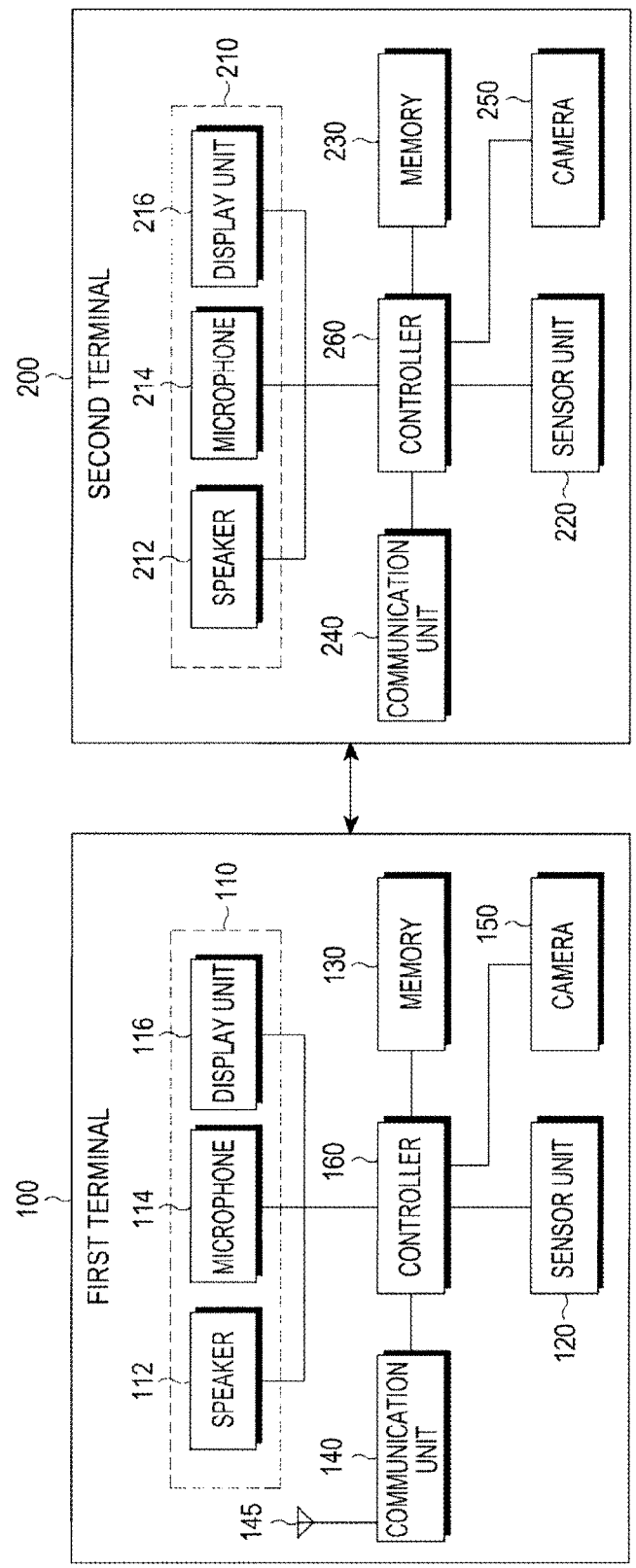
FIG. 1 is a block diagram of a multiple display system, according to an exemplary embodiment of the present invention.

FIG. 1 is a block diagram of a multiple display system, according to an exemplary embodiment of the present invention. The multiple display system includes first and second terminals 100 and 200. Although the first and second terminals 100 and 200 are illustrated to have the same configuration in the illustrated embodiment, they may have different configurations in other embodiments. The following description includes details provided in terms of the first terminal 100, but the description may also be applied to the second terminal 200. Similarly, a description for the second terminal 200 may also be applied to the first terminal 100.

The first terminal 100 may comprise, for example, a smartphone, a cell phone, a game console, a television, a display device, a vehicle head unit, a notebook, a laptop, a tablet, phablet, personal computer (PC), a Personal Media Player (PMP), a Personal Digital Assistant (PDA), just to name a few non-limiting possibilities. In the following description, the word 'terminal' may be interchangeably used with the terms 'device', 'electronic device', 'apparatus', 'portable terminal', 'communication terminal', 'portable communication terminal', etc. and any other suitable expression, numerous examples of which will readily occur to a person of ordinary skill in the art.

The first terminal 100 may communicate with the second terminal 200, or perform a task in association with the second terminal 200. The first terminal 100 may transmit screen data to the second terminal 200 directly, via a server or other intermediate entity, or via a network. The first terminal 100 may control the second terminal 200 or may operate under control of the second terminal 200. Such controlling may be implemented in various ways. The network may include, but not exclusively, a Local Area Network (LAN), a Wireless Local Area Network (WLAN), a Wide Area Network (WAN), the Internet, a Small Area Network (SAN), and the like.

The first terminal 100 as shown in this example includes a first user interface 110 having a first speaker 112, a first microphone 114 and a first display unit 116, a first sensor unit 120, a first memory 130, a first communication unit 140, a first camera 150, and a first controller 160. One or more of these components may be optionally omitted in the first terminal 100 or replaced with equivalent or similar components, and/or one or more additional components may optionally be added.

The first speaker 112 can output sounds that correspond to various signals (e.g., radio frequency (RF) signals, broadcast signals, digital audio files, digital video files or photographic images) to the outside of the first terminal 160. The first speaker 112 can output a sound that corresponds to a function performed by the first terminal 100. There may be one or multiple speakers 112 arranged in a proper position or proper positions in the first terminal 100.

The first microphone 114 receives voice and/or sounds from outside of the first terminal 100 and generates electric signals from the voice or sounds.

The first display unit 116 displays images based on image signals input from the first controller 160 while receiving user input data, i.e., user input information and outputting the user input data to the first controller 160. The first display unit 116 in this example includes a display part, for example liquid crystal display (LCD), organic emitting diodes (OLEDs), or LEDs, and a touch panel arranged under or on top of the display part. The touch panel detects user inputs. When a user input means (e.g., a finger, a stylus pen, etc.) presses or touches the surface of the first display unit 116, or comes within a predetermined distance from the first display unit 116, i.e., the screen to be considered a touch or a contactless touch (i.e., hovering), the touch panel outputs a detection signal (e.g. a touch detection signal or proximity detection signal) that has information about input positions (or coordinates) and/or input states (e.g., mouse down, mouse up, mouse movement, etc.). For example, the user touches any one of a plurality of executable items displayed on the screen of the first display unit 116 to run an application related to the item. The display unit 116 comprises hardware and provides a means for receiving user inputs and for outputting screen data related to applications, such as a camera application, a video communication application, an Internet application, etc. In this exemplary embodiment, the touchscreen is taken as an example of the first display unit 116, but the first display unit 116 may could be a display without the touch panel. In the present invention, the screen may represent the whole or a part of an image displayed by the first display unit 116.

The touchscreen preferably provides the user with a graphical user interface (GUI) for various services (e.g., call, data transmission, broadcasting, photography/video capture services). The touchscreen may provide user input data that corresponds to at least one touch on the GUI to the first controller 160.

Inputs in the present invention are not limited to physical touches by a physical contact of the user or contact using the touchable input means, but may also include touchless inputs (e.g., an input where there is a detectable distance less than a threshold distance, for example 1 cm, between the touch screen and the user's body or touchable input means). The touchscreen may be implemented in the form of e.g., a resistive construction, capacitive construction, infrared construction, acoustic wave construction, electronic magnetic resonance (EMR) construction or combination thereof.

The first user interface 110 includes a structure for receiving user inputs or presenting information to the user, including, for example, a plurality of buttons, a vibration motor, a connector, a keypad, etc. The first user interface 110, comprising, but not limited to, one or more of a mouse, a trackball, a joystick or a cursor control, for example direction keys, may be provided to control information communication with the first controller 160 and cursor movement on the first display unit 116.

The buttons may be arranged on the front, side, and/or back of the first terminal 100, and may include at least one of power/lock button (not shown), volume button (not shown), menu button, home button, back button, and search button.

The vibrating motor preferably converts an electric signal to a mechanical vibration under control of the first controller 160. For example, the first terminal 100 in a vibrating mode operates the vibrating motor when receiving a voice call from another device (not shown). One or more vibration motors may be formed within the first terminal 100. The vibration motor may operate in response to the user's touch on the touch screen.

The connector can be used as an interface for connecting the first terminal 100 to an external device or a power source (not shown). Data stored in the first memory 130 of the first terminal 100 can be transmitted to and/or received from the external device through a cable connected to the connector, under control of the first controller 160. The first terminal 100 may be powered or the battery of the first terminal 100 may be charged from the power source via the cable.

The keypad is adapted to receive and detect key inputs from the user to control the first terminal 100. The keypad may comprise, for example, a mechanical keypad formed in the first terminal 100 or a virtual keypad displayed on the touchscreen.

The first sensor unit 120 comprises hardware such as at least one sensor for detecting a state (e.g., position, orientation, direction, movement) of the first terminal 100. For example, the first sensor unit 120 may include a proximity sensor for detecting the proximity of the nearby user of the first terminal 100, and/or a motion sensor for detecting a movement (e.g., rotation, acceleration, deceleration, vibration, etc.) of the first terminal 100. The motion sensor may comprise an acceleration sensor, a gravity sensor, a shock sensor, a GPS, a compass sensor, etc. The first sensor unit 120 can detect the state of the first terminal 100, generate a signal corresponding to the detection result, and provide the signal to the first controller 160. For example, the GPS receives radio signals from a plurality of GPS satellites (not shown) in Earth's orbit, and the GPS or the first controller 160 may calculate the position of the first terminal 100 by using time of arrival from the GPS satellites to the first terminal 100.

The first memory 130, which may be a non-transitory machine readable medium, may store various applications, such as the video call application, game applications, etc., images for providing the GUI for the application, user information, documents, fingerprint information/data, databases related to a mapping table of fingerprints and functions, background images (menu screens, standby screens, etc.) or operating programs required to drive the first terminal 100, images captured by the camera. The machine-readable medium preferably comprises a storage medium. The first memory 130 may include non-volatile media and volatile media. These media should be all tangible for a mechanical device to read out instructions embodied on the media.

The machine-readable media includes, but is not limited to, at least one of floppy disks, flexible disks, hard disc, magnetic tapes, compact disc read-only memories (CD-ROMs), optical discs, punch cards, paper tapes, random access memories (RAM), programmable read-only memories (PROM), erasable PROM (EPROM), and flash-EPROMs.

The first communication unit 140 connects the first terminal 100 to an external device. The connection may be made directly or indirectly, for example via a network, and may be wired or wireless. The connection allows wired or wireless transmitting of data from the first controller 160, the first memory 130, the first camera 150, etc., or wired or wireless receiving of data. The data may be forwarded to the first controller 160, and/or stored in the first memory 130.

The first communication unit 140 comprises hardware and, in certain embodiments, includes a transceiver for at least one of a mobile communication module, WLAN module and LAN module depending on its configuration. As a non-limiting example, the first communication unit 140 may comprise an integrated services digital network (ISDN) card, a modem, a LAN card, an infrared device, a Bluetooth device, a Zigbee device, a wireless device, etc. The first communication unit 140 may be configured to support any of the various wireless communication protocols, for example Universal Mobile Telecommunications System (UMTS), Global System for Mobile communications (GSM), Code Division Multiple Access (CDMA), CDMA2000, World Interoperability for Microwave Access (WIMAX), 3G Long Term Evolution (3G LTE), wireless fidelity (WiFi) (802.11x), infrared, Zigbee, Near Field Communications (NFC), Radio-Frequency IDentification (RFID), Bluetooth, UltraWideBand (UWB), etc.

The mobile communication module connects the first terminal 100 to an external device through communication (e.g. mobile communication) using at least one antenna 145 under control of the first controller 160. The transceiver(s) of the mobile communication module transmits/receives wireless signals for voice calls, video conference calls, short message service (SMS) messages, or multimedia message service (MMS) messages to/from a cell phone (not shown), a smart phone (not shown), a tablet (not shown), phablet, netbook, or another device (not shown), the phones typically having phone numbers or network addresses entered into the first terminal 100.

The WLAN module also comprises hardware such as a transceiver and may be connected to the Internet in a place where there is an access point (AP) (not shown), under control of the first controller 160. The WLAN module supports IEEE's WLAN standard IEEE802.11x. The NFC module enables wireless short-range communications between the first terminal 100 and the external device under control of the first controller 160. An artisan should understand that the claimed invention is statutory and no particular item or items constitute pure software, or software per se.

The first camera 150 preferably includes a lens system, a driving unit and an image sensor, and may further include a flash. The first camera 150 converts optical signals input (or captured) through the lens system to electric image signals or data for output, and the user may capture a video image or a still image with the first camera 150. In other words, the first camera 150 forms an optical image of an object and detects the optical image as an electric signal.

The lens system forms the image of the object by converging light incident from the outside. The lens system includes at least one lens, each lens being a convex lens or a concave lens. The lens system is symmetrical with respect to an optical axis passing through the center of the lens system, and the optical axis is defined as a central axis of the lens system. The image sensor detects the optical image formed by external light incident through the lens system as an electric image signal.

The image sensor may include a plurality of pixels arranged in an M×N matrix structure, each of which may have a photo diode and at least one transistor. The pixel accumulates charges generated by the incident light (in an exposure procedure). A voltage caused by the accumulated charges represents intensity of the incident light (in an image output procedure). In a case of processing an image constituting a still image or a video image, image data output from the image sensor consists of a set of voltages (i.e., pixel values) output from the pixels and represents an image (i.e., a still image). The image is comprised of M×N pixels. The image sensor in this example preferably comprises at least one of a charge-coupled device (CCD) image sensor, or a complementary metal-oxide semiconductor (CMOS) image sensor, etc.

The driving unit drives the image sensor under control of the first controller 160. The driving unit exposes an entirety of pixels of the image sensor or pixels only in an area of interest from among the whole pixels according to a control signal received from the first controller 160, and the image data output from the pixels is output to the first controller 160.

The first controller 160, which may comprise hardware, for example a processor or microprocessor, executes an application in response to user input data. The application may comprise machine executable instructions, and executes according to the user input data. The user input may include inputs through a keypad or a touch screen, or camera based inputs. The first controller 160 preferably includes a bus for information communication and a processor coupled with the bus for information processing. The first controller 160 may also include a second memory (e.g., a random access memory (RAM)) coupled with the bus for storing information required by the processor. The second memory may be used to store temporary information required by the processor. The first terminal 100 may further include a read only memory (ROM) coupled with the bus for storing static information required by the processor. The first controller 160 is a central processing unit for controlling general operations of the first terminal 100, and serves to perform a multiple display method according to exemplary embodiments of the present invention. The first controller 160 processes an image input from the first camera 150 or an image stored in the first memory 130 on a frame-by-frame basis, and outputs image frames adapted to screen properties (size, image quality, resolution, etc.) of the first display unit 116.

With continued reference to FIG. 1, the second terminal 200 includes a second user interface 210 having a second speaker 212, a second microphone 214 and a second display unit 216, a second sensor unit 220, a second memory 230, a second communication unit 240, a second camera 250, and a second controller 260. Components of the second terminal 200 have the same functions and operations as those of the first terminal 100.

The multiple display method of the present method is performed by cooperation between a first terminal (e.g. main terminal) configuring screen data and a second terminal (e.g. sub terminal) configuring its own screen based on the screen data received from the main terminal. In the exemplary embodiment illustrated in FIG. 1, the first terminal 100 is the main terminal and the second terminal 200 is the sub terminal. In some embodiments, there may be one sub terminal. In other embodiments, there may be two or more sub terminals.

The first controller 160 configures screen data, wherein the screen data includes first screen data to be displayed on the first display unit 116 of the first terminal 100 and second screen data to be displayed on the second display unit 216 of the second terminal 200. The screen data refers to any data able to form a screen, and may comprise, for example, image data, application data, etc. The first controller 160 configures the screen data based on one or more multiple display schemes, for example that are selected according to user input data, user settings, default settings etc. The multiple-display scheme may be a "divisional display scheme", in which an image, screen or user interface etc. is displayed by dividing the image, screen or user interface, and wherein parts of the divided image, screen or user interface are displayed on respective display units of multiple display units. The multiple-display scheme may be an "independent display scheme", in which a number of applications or windows etc. are displayed on respective display units of the multiple display units.

In various embodiments, one or more images, screens, user interfaces, applications, windows, and/or other graphical elements, features and/or aspects of a display, may be divided and allocated to first and second screens, to be displayed by the first and second terminals, in any suitable way. For example, in one embodiment, the first and second screens may each comprise an application. In another embodiment, a single image or application may be divided between the first and second screens. In another embodiment, the first screen may comprise one of an image and an application, while the second screen may comprise the other of the image and the application. Numerous examples will readily occur to the skilled person, some of which are described below.

The first controller 160 transmits the second screen data to the second terminal 200 via the communication unit 140, receives user input data from the second terminal 200 via the communication unit 140, and updates the screen data based on the user input data. The first and second screen data may be updated simultaneously, or only one of them may be updated.

In the following description, a person of ordinary skill in the art will understand and appreciate that operations performed by each terminal may be implemented in certain embodiments such that a controller of the terminal controls other components to perform the operation. Data generated within each terminal or received from outside may be stored in a memory of the terminal. In light of the foregoing operations of components of the terminals, it will be appreciated that operations performed by the controller may be performed with corresponding components. For example, communication with an external device involves the communication unit; data display involves the display unit; photography involves the camera; event or condition detection involves the sensor unit, and so on.

Figure 2:
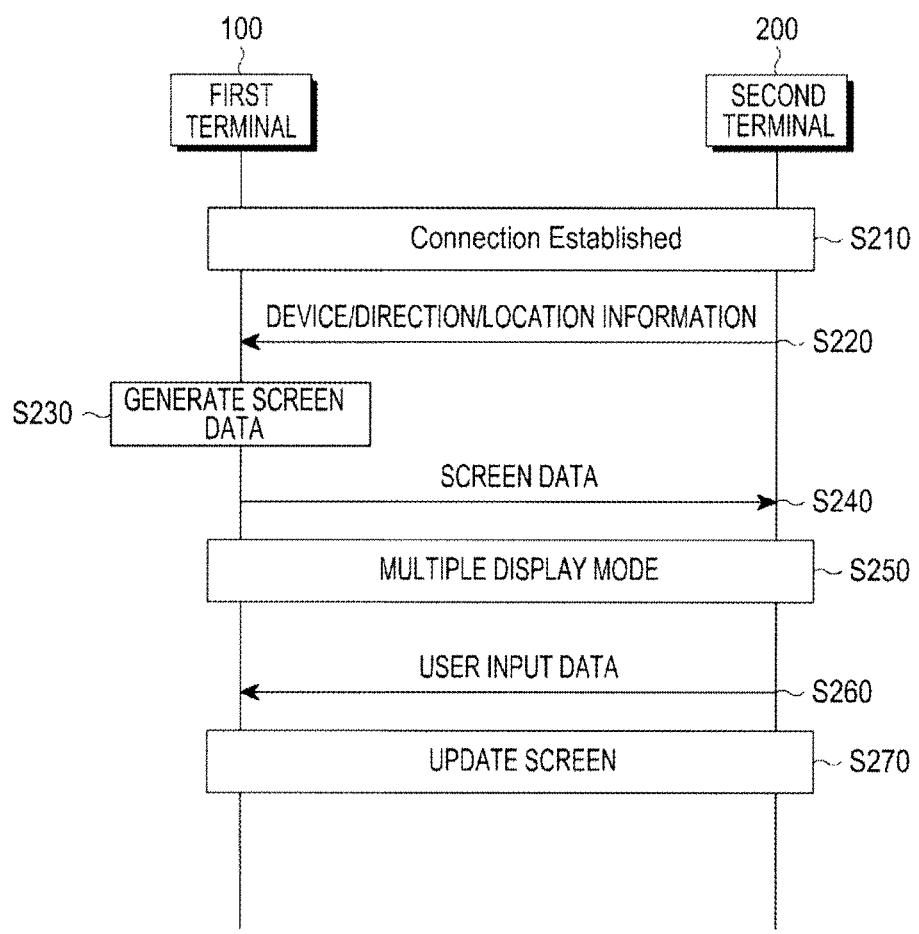
FIG. 2 is a flowchart showing a non-limiting operational example of a multiple display method, according to an exemplary embodiment of the present invention.

FIG. 2 is a flowchart of a multiple display method, according to an exemplary embodiment of the present invention. As can be seen, in this example first terminal 100 and second terminal 200 participate.

At step S210, a wireless connection occurs between the first terminal 100 and the second terminal 200 using the first and second communication units 140 and 240. The wireless connection may be established according to at least one or more of wireless communication protocols, for example WiFi (802.11x), infrared, Zigbee, NFC, RFID, Bluetooth, UWB, etc. The wireless connection may be initiated by automatic device discovery performed by each of the first terminal 100 and the second terminal 200, or by the user running the same multiple display applications installed in the first and second terminals 100 and 200. The user may select the main terminal and the sub terminal through the multiple display application. Any of steps S220 to S250 may be initiated based on a predetermined event that occurs between the first and second terminals 100 and 200, the predetermined event including, for example a collision event or proximity event detected by the first or second sensor unit 120 or 220. The collision event may comprise, for example, physical collision or contact between the first and second terminals. The proximity event may comprise, for example, the mutual approach of the first and second terminals such that the terminals become arranged within a predetermined threshold distance therebetween.

At step S220, the first controller 160 in this example receives the device information from the other terminal (second terminal 200), the device information comprising, for example the resolution of the second display unit 216, the size of the second display unit 216, a model name of the second terminal 200, and/or unique identification of the second terminal 200, etc. The device information is received through the first communication unit 140 to configure screen data. In certain embodiments, the first controller 160 may identify from the device information a device type or device characteristics of the second terminal 200, and/or a type or characteristics of the display unit being used. Alternatively, or additionally, the first controller 160 may receive direction (or orientation) information and/or location information of the second terminal 200. The direction (or orientation) information and/or the location information may be regarded as being part of the device information, or alternatively, may be regarded as being separate information in addition, or as an alternative, to the above-mentioned device information. The direction (or orientation) information may indicate a direction toward which a central axis of the second terminal 200 heads (i.e. indicate an orientation of the second terminal 200 with respect to a reference orientation, or relative to the orientation of the first terminal 100). The central axis may be set up arbitrarily, or set up to be an axis dividing the width of the second terminal 200 into halves. The location information may comprise, for example, information indicating the relative positions of the first and second terminal (e.g. whether the second terminal is above, below, to the left of, to the right of, or diagonally positioned in relation to the first terminal). The location information may also comprise, for example, information indicating the distance of separation of the first and second terminals.

At step S230, the first controller 160 generates the screen data based on at least one of the device information, the direction information (or orientation information), and location information of the second terminal 200. In certain embodiments, the first controller 160 may generate the screen data based additionally on at least one of device information, direction information (or orientation information), and location information of the first terminal. The first controller 160 may generate the screen data according to a multiple display scheme. In the case of the divisional display scheme, first screen data and second screen data may represent images resulting from division of an image, such as an application window, a home screen, or the like into parts (e.g. halves). In the case of the independent display scheme, the first screen data may represent an application window while the second screen data may represent information about an application to run. In the following description, the term 'application window' may be interchangeably used with an 'application image'. The device information, the first and second screen data may be stored in the first memory 130.

At step S240, the first controller 160 transmits the second screen data to the second terminal 200 through the first communication unit 140. In case of the divisional display scheme, generation and transmission of the second screen data may be performed periodically; and in case of the independent display scheme, it may be performed non-periodically, e.g., upon the occurrence of an event, such as a user input.

At step S250, in the multiple display mode, the first terminal 100 displays a first screen on the first display unit 116 based on the first screen data, and the second terminal 200 displays a second screen on the second display unit 216 based on the second screen data.

At step S260, in which the first terminal 100 receives user input data, the second controller 260 detects a user input through the second user interface 210, generates user input data based on the user input, and transmits the user input data to the first terminal 100 through the second communication unit 240, and the first controller 160 receives the user input data from the second terminal 200 through the first communication unit 140.

At step S270, the first controller 160 updates the screen data based on the user input data. Here, the first and second screen data may be updated (e.g. simultaneously), or only one of them may be updated. The first terminal 100 may only update and display its own screen, or alternatively, in addition to updating and displaying its own screen, the first terminal may transmit the second screen data for the second terminal 200 to update its screen. Alternatively, the first terminal 100 may not update its own screen, but only transmit the second screen data for the second terminal 200 to update its screen.

Figure 3A:
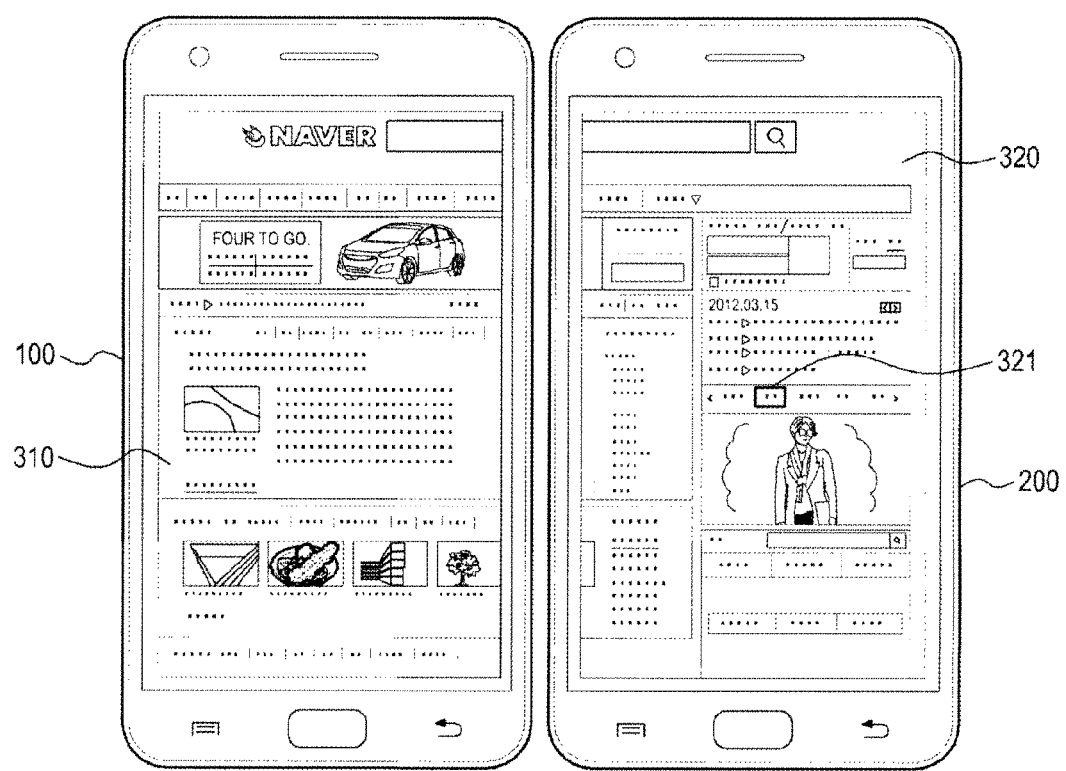
FIGS. 3A and 3B are diagrams illustrating the multiple display method, according to a first exemplary embodiment of the present invention.
Figure 3B:
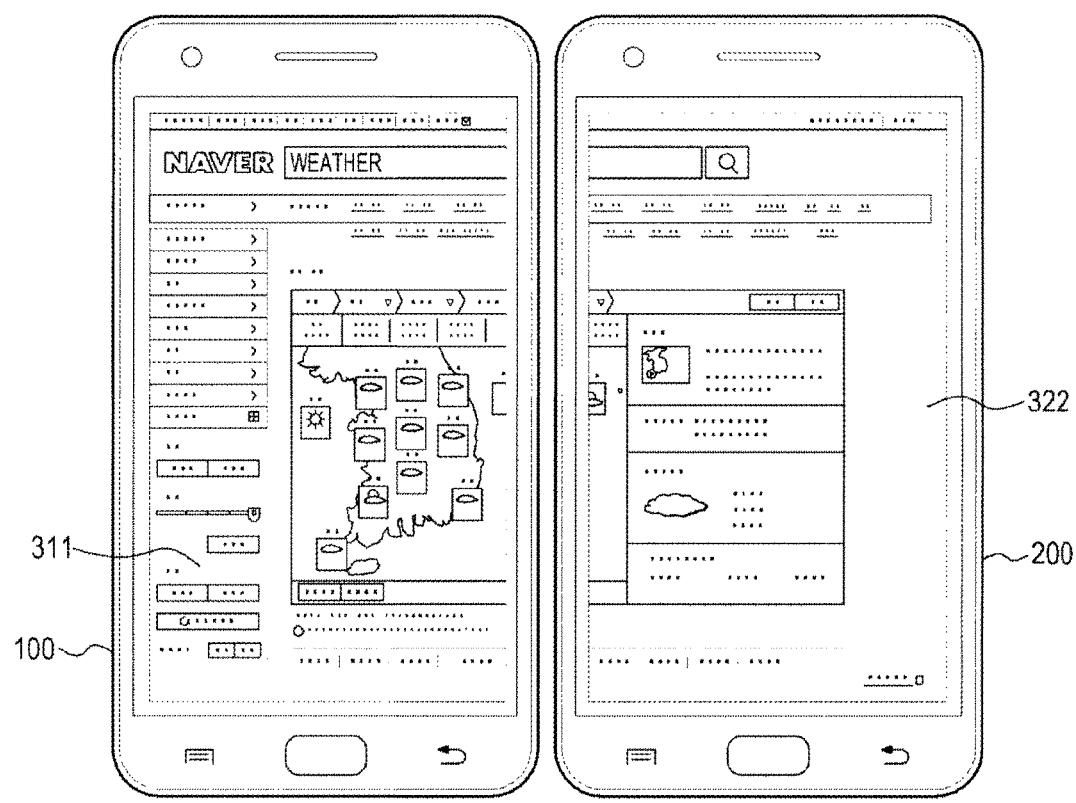

FIGS. 3A and 3B are diagrams illustrating the multiple display method, according to a first embodiment of the present invention. In the following description, the terms 'application window' (which, in the present embodiment, is in the form of a text input interface, as an exemplary type of application window) and 'screen' may be interchangeably used.

Referring to FIG. 3A, an Internet application window is divided into first and second screens 310 and 320, the first screen 310 being displayed on the first terminal 100 and the second screen 320 being displayed on the second terminal 200.

In the second screen 320 as shown in FIG. 3A, if the user selects or clicks on a weather item 321, the second controller 260 detects such a user input and the second terminal 200 transmits the user input data based on the user input to the first terminal 100. Thus the two terminals can be selectively used interactively such that the two terminals cooperate to provide a single large screen, rather than two individual smaller screens.

Referring now to FIG. 3B, the first controller 160 updates its screen data in response to the user input data, divides updated weather-related screen data into the first and second screen data, and transmits the second screen data to the second terminal 200. As shown in FIGS. 3A and 3B, the first terminal 100 displays a first screen 311 updated based on the first screen data and the second terminal 200 displays a second screen 322 updated based on the second screen data. When the user selects or clicks on an item on the first screen 310, the first controller 160 detects the user input and the first terminal 100 may update the first and second screens 310 and 320 based on the user input data.

Figure 4A:
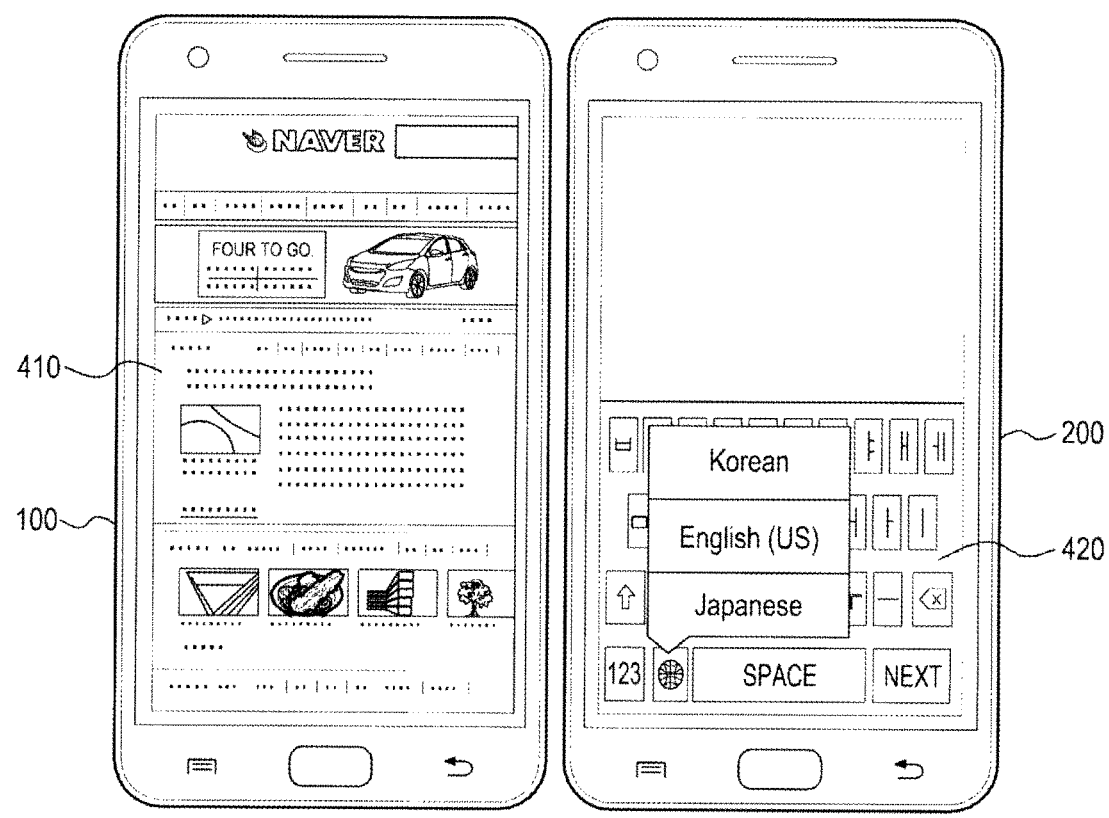
FIGS. 4A and 4B are diagrams illustrating the multiple display method, according to a second exemplary embodiment of the present invention.
Figure 4B:
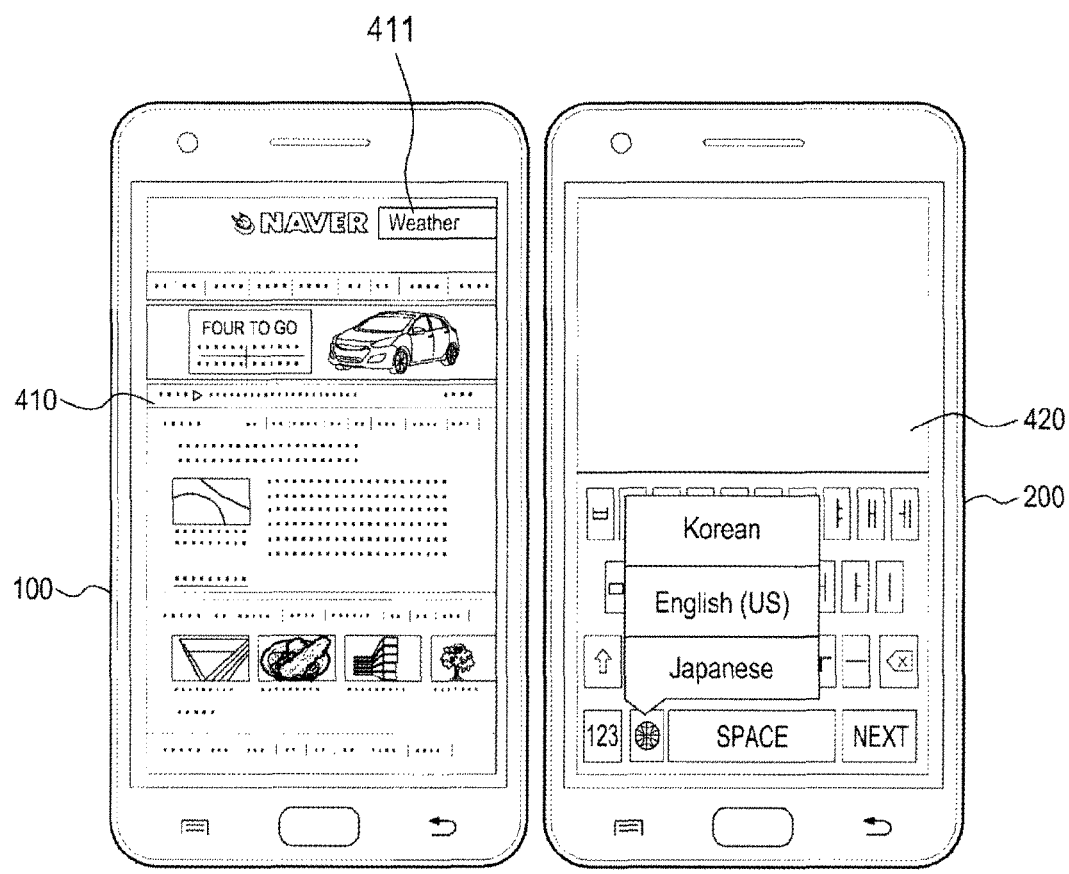

FIGS. 4A and 4B are additional diagrams illustrating the multiple display method, according to a second exemplary embodiment of the present invention.

Referring now to FIG. 4A, the first terminal 100 displays a first screen 410 that represents a single Internet application window and the second terminal 200 displays a second screen 420 that represents a text input interface. The first screen 410 representing the single Internet application window means that the first screen 410 displays the Internet application window as is without splitting the application window across two screens. However, while the first screen 410 displays the Internet application window as is without splitting, this does not mean that the first screen 410 is fully occupied by the Internet application window. In other words, the Internet application window may be displayed on a part of the first screen 410.

In the second screen 420 as shown in FIG. 4A, if the user enters a word "weather" through the text input interface, the second controller 260 detects the user input and transmits the user input data based on the user input to the first terminal 100.

Referring now to FIG. 4B, the first controller 160 updates its screen data in response to the user input data and displays the first screen 410 updated based on the updated screen data. As shown in FIG. 4B, a word "weather" is entered and displayed in a search window 411 of the Internet application window.

Figure 5A:
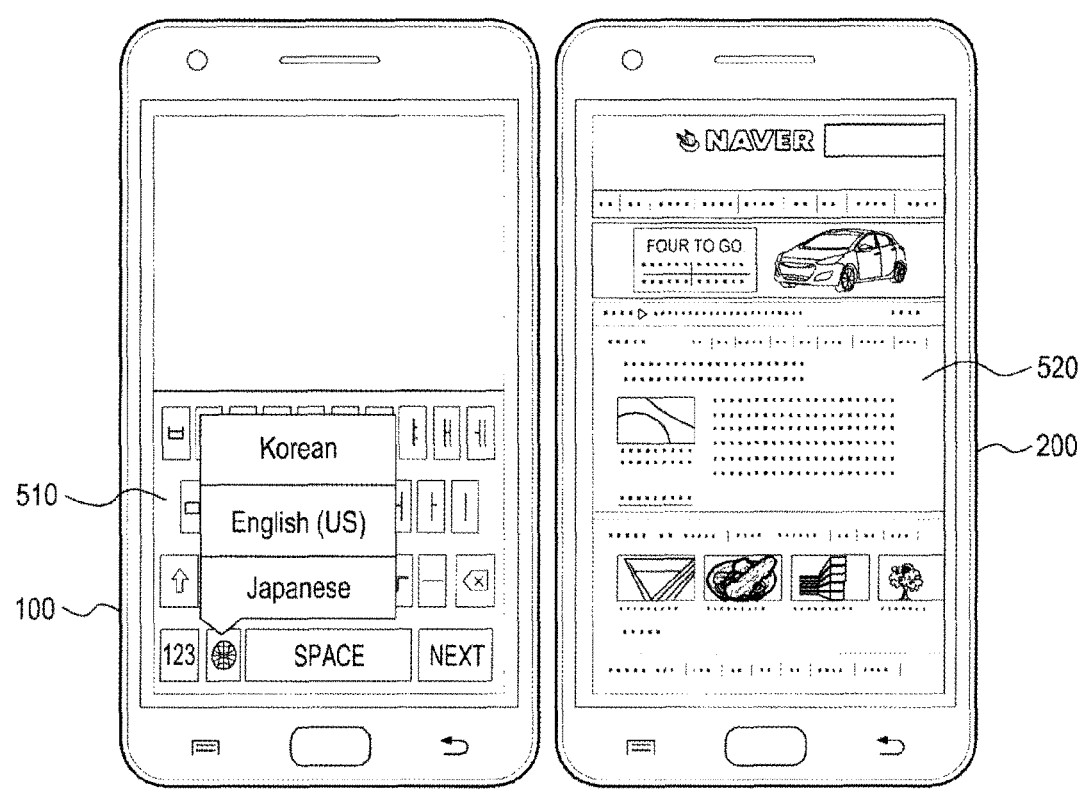
FIGS. 5A and 5B are diagrams illustrating the multiple display method, according to a third exemplary embodiment of the present invention.
Figure 5B:
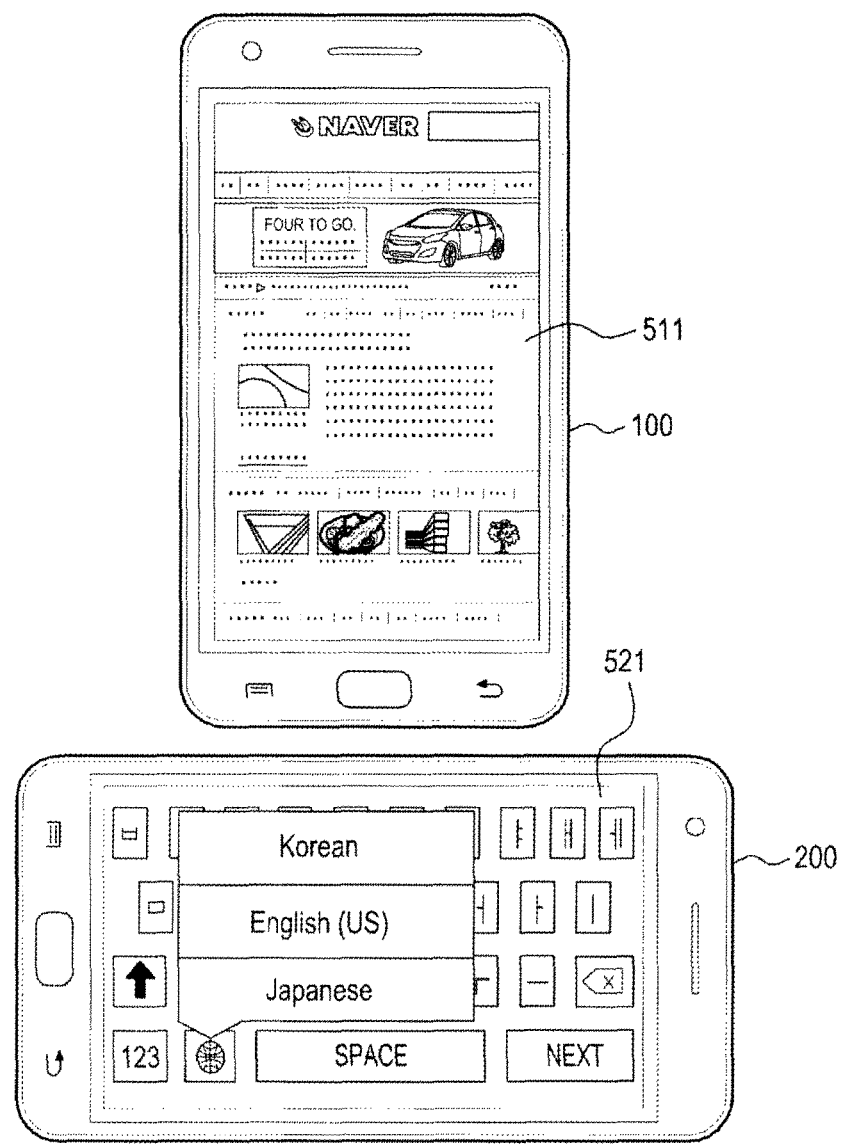

FIGS. 5A and 5B are diagrams illustrating the multiple display method, according to a third exemplary embodiment of the present invention.

The first controller 160 may configure the screen data based on user's device usage history, user settings, direction information, location information, etc. stored in the first memory 130.

FIG. 5A illustrates a case of configuring the screen data based on the user's device usage history or the user settings.

As shown in FIG. 5A, the first controller 160 determines that the user is left-handed by searching the user's device usage history or user settings, and configures the screen data to be adapted to this condition. In other words, the first terminal 100 may display a first screen 510 that represents the text input interface and the second terminal 200 may display a second screen 520 that represents an Internet application window. With respect to identification of the user settings, the first controller 160 may determine whether the user is left-handed or right-handed by searching predetermined settings for the text input interface to find out whether it is for right-handed or for left-handed or analyzing the distribution of user touches in order to determine whether the user touches are mainly made in the left area or in the right area of the screen.

FIG. 5B illustrates an example of configuring the screen data based on the direction information of the first and second terminals 100 and 200.

The central axis (not shown) of the first terminal 100 lies in the upward direction and the central axis (not shown) of the second terminal 200 lies in the rightward direction. The first terminal 100 receives the direction information of the second terminal 200 from the second terminal 200.

The first controller 160 determines the central axis of the first terminal 100 being perpendicular to the central axis of the second terminal 200 and configures the screen data to be adapted to this condition. A person of ordinary skill in the art will understand and appreciate that, for example, one or more of sensors, gyroscope, tilt switch, etc., can be used to determine the central axis. Specifically, the first terminal 100 may display a single Internet application window 511 vertically, and the second terminal 200 may display a text input interface 521 horizontally. That is, the first controller 160 aligns the text input interface 521 with the direction of the second terminal 200. Such display direction information of the text input interface 521 is transmitted to the second terminal 200 in the second screen data.

Figure 6A:
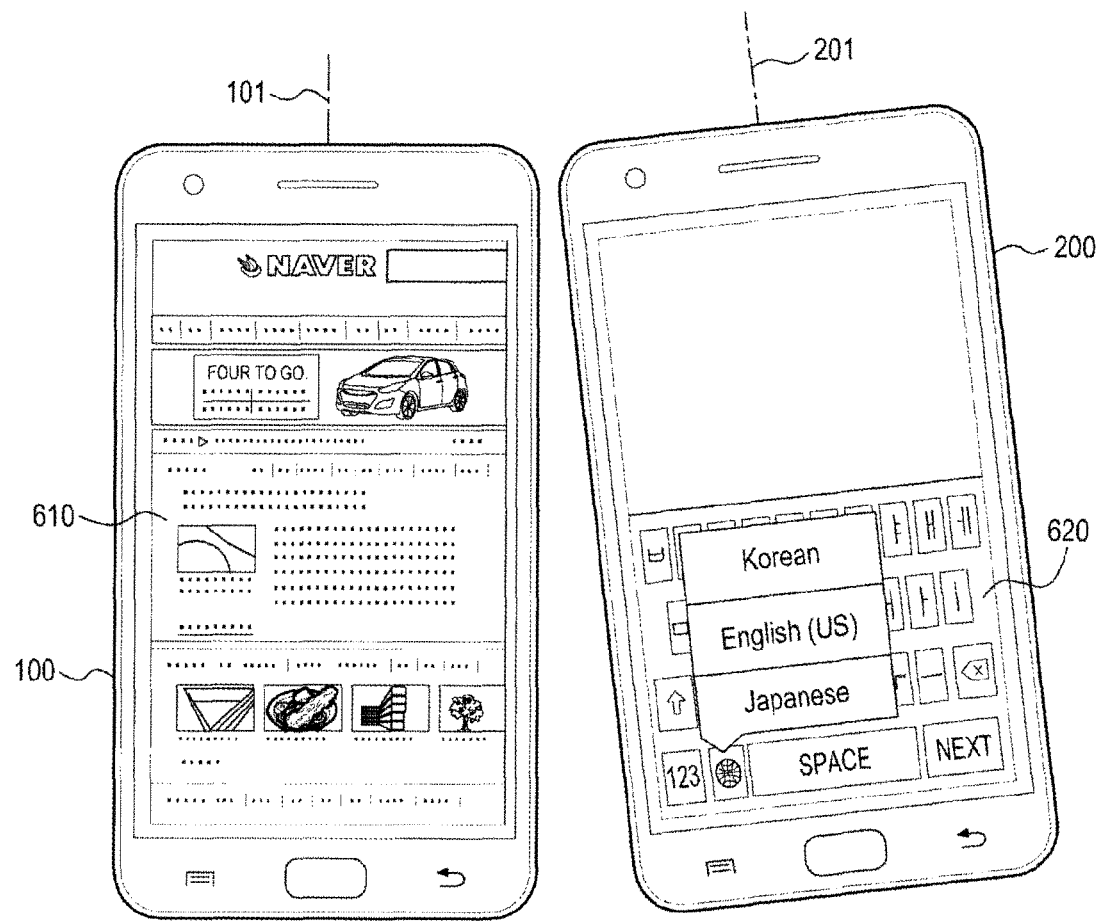
FIGS. 6A and 6B are diagrams illustrating the multiple display method, according to a fourth exemplary embodiment of the present invention.
Figure 6B:
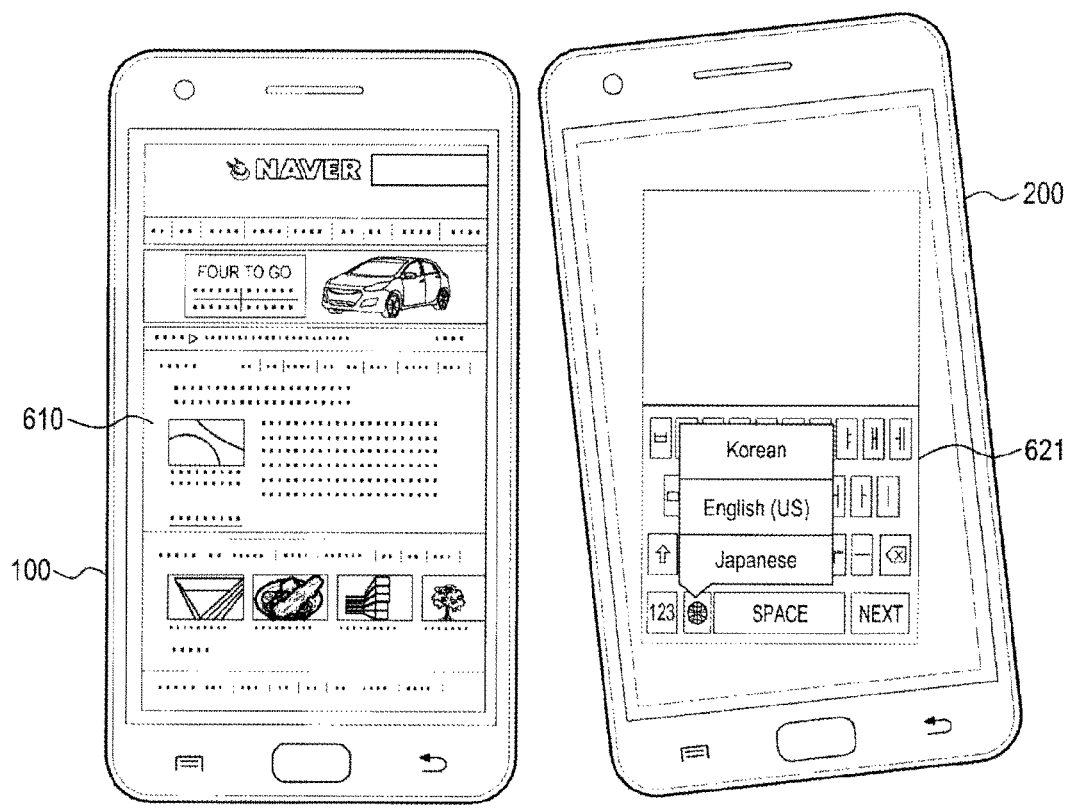

FIGS. 6A and 6B are diagrams illustrating the multiple display method, according to a fourth exemplary embodiment of the present invention. FIGS. 6A and 6B represent another case of configuring the screen data based on the direction information.

Referring now to FIG. 6A for explaining a problem in case of not taking the direction information into account, the first terminal 100 displays a first screen 610 that represents a single Internet application window 610 and the second terminal 200 displays a second screen 620 that represents a text input interface. The central axes 101 and 201 of the first and second terminals 100 and 200 do not correspond to each other, i.e., they are not parallel to each other, the second central axis 201 being slanted toward the first central axis 101 with the second screen being also slanted. In this case, the user may have difficulty entering a text because the text input interface is tilted.

FIG. 6B illustrates a case of configuring the screen data based on the direction information of the first and second terminals 100 and 200.

The first controller 160 determines that the second central axis 201 of the second terminal 200 is slanted toward the first central axis 101 of the first terminal 100 and aligns the text input interface to the first central axis 101 of the first terminal 100.

More particularly, a second screen 621 of the second terminal 200 is tilted at an angle between the first and second central axes of the first and second terminals 100 and 200 toward the opposite of the direction toward which the second terminal 200 is tilted. Such tilt information of the second screen 621 is transmitted to the second terminal 200 in the second screen data. Therefore, the orientation of the screen does not have to remain essentially in a either a portrait or landscape and can be shown tilted relative to the second terminal 200 but in alignment with the first terminal 100 so that the user sees a level display.

Figure 7A:
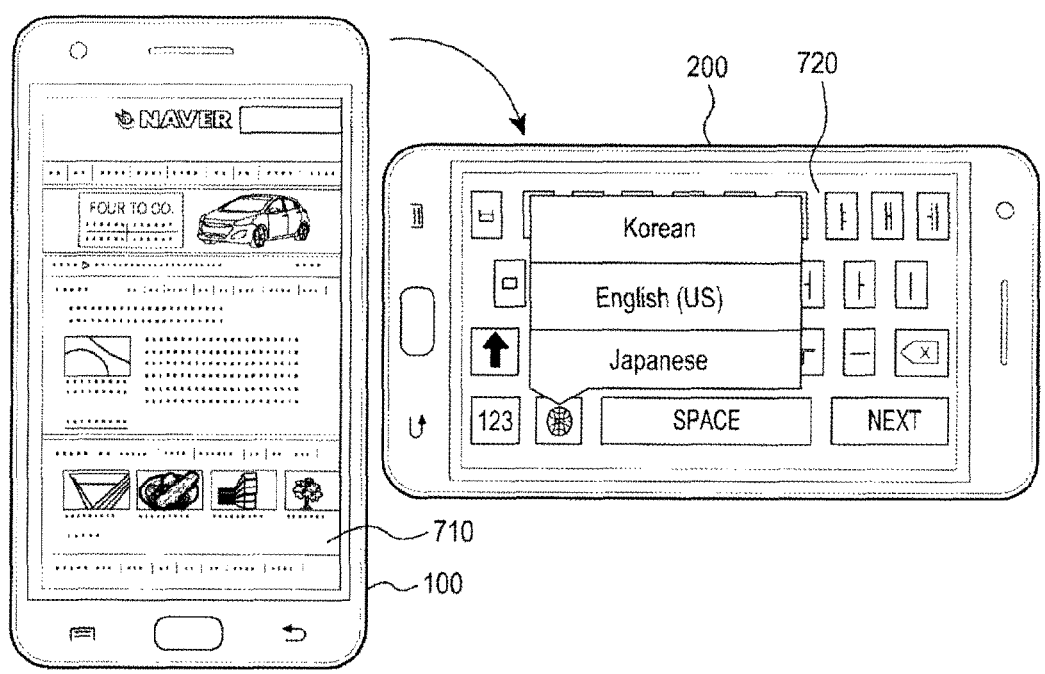
FIGS. 7A and 7B are diagrams illustrating the multiple display method, according to a fifth exemplary embodiment of the present invention.
Figure 7B:
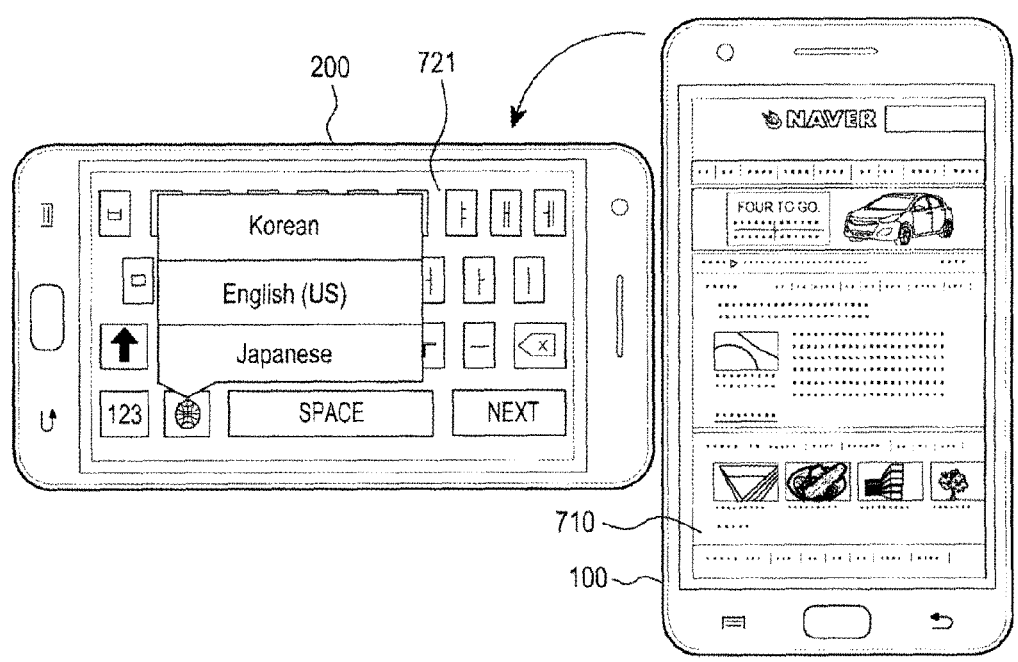

FIGS. 7A and 7B are diagrams illustrating the multiple display method, according to a fifth exemplary embodiment of the present invention. FIGS. 7A and 7B represent another case of configuring the screen data based on the direction information.

Referring now to FIG. 7A, the central axis (not shown) of the first terminal 100 lies in the upward direction and the central axis of the second terminal 200 lies in the rightward direction. The first terminal 100 receives the direction information of the second terminal 200 from the second terminal 200. The first controller 160 figures out the central axis of the second terminal 200 being rotated 90 degrees in clockwise direction from the central axis of the first terminal 100 and configures the screen data to be adapted to this condition. Specifically, the first terminal 100 may display a single Internet application window 710 vertically, and the second terminal 200 may display a text input interface 720 horizontally. In other words, the first controller 160 aligns the text input interface 720 with the direction of the first terminal 100. Such direction information of the text input interface 720 is transmitted to the second terminal 200 in the second screen data.

Referring now to FIG. 7B, the first central axis (not shown) of the first terminal 100 lies in the upward direction and the second central axis (not shown) of the second terminal 200 lies in the leftward direction. The first controller 160 determines the central axis of the second terminal 200 being rotated 90 degrees in counterclockwise direction from the central axis of the first terminal 100 and configures the screen data to be adapted to this condition. Specifically, the first terminal 100 may display a single Internet application window 710 vertically, and the second terminal 200 may display a text input interface 721 horizontally and erectly. The first controller 160 aligns the text input interface 721 with the direction of the first terminal 100. That is, the first controller 160 controls the text input interface 721 not to be displayed in an inverted orientation.

Figure 8A:
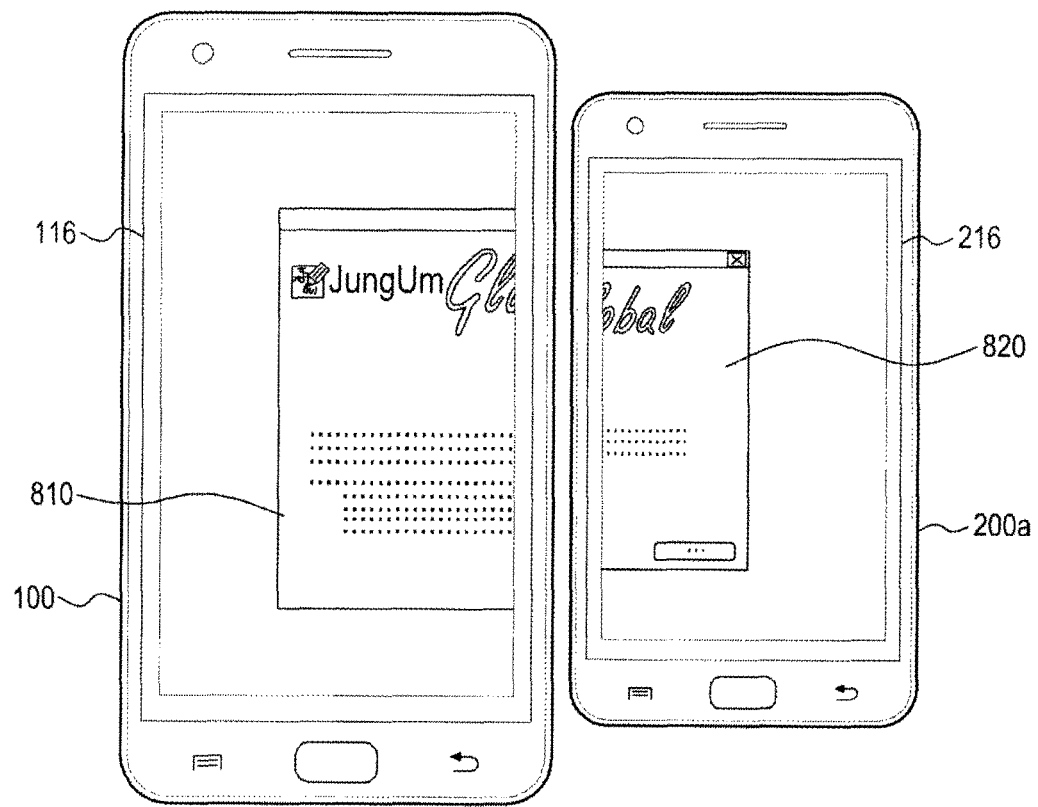
FIGS. 8A and 8B are diagrams illustrating the multiple display method, according to a sixth exemplary embodiment of the present invention.
Figure 8B:
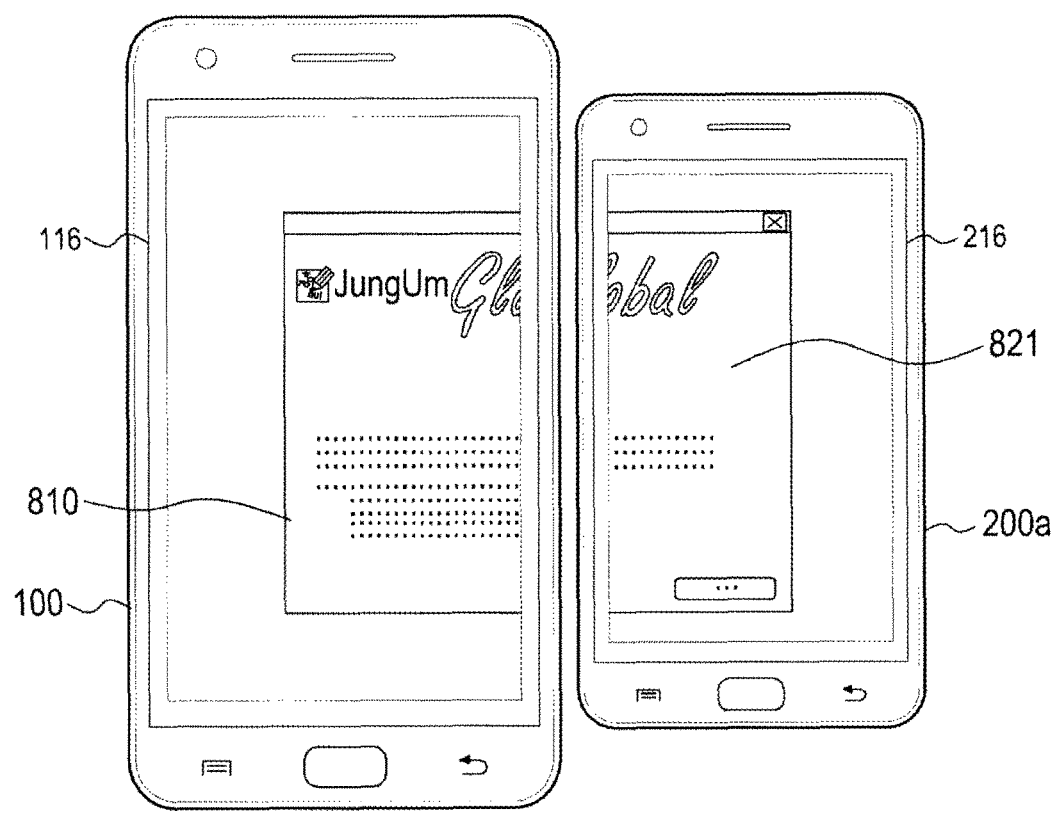

FIGS. 8A and 8B are diagrams illustrating the multiple display method, according to a sixth exemplary embodiment of the present invention. FIGS. 8A and 8B represent a case of configuring the screen data based on the device information. In FIGS. 8A and 8B, a second terminal 200a has the same configuration as that of the foregoing second terminal 200 except that the size of the display unit is relatively smaller compared with what has been illustrated in previous drawings.

Referring now to FIG. 8A for explaining a problem in case of not taking the direction information into account, a word (or documenting) application window is divided into first and second screens 810 and 820, the first screen 310 being displayed on the first terminal 100 and the second screen 820 being displayed on the second terminal 200a. The size of the second display unit 216 of the second terminal 200a is smaller than that of the first display unit 116 of the first terminal 100. In this case, two parts of the word application window look different to the user, thus possibly causing inconvenience to the user.

FIG. 8B illustrates a case of configuring the screen data based on the device information of the first and second terminals 100 and 200a.

The first controller 160 determines that the size of the second display unit 216 of the second terminal 200a is smaller than that of the first display unit 116 of the first terminal 100, and controls a part of the word application window to be displayed on the second terminal 200*a* to be expanded or controls another part of the word application window to be displayed on the first terminal 100 to be reduced. In case of the screen expansion, such expansion information of the second screen 821 is transmitted to the second terminal 200*a* in the second screen data.

In the embodiments described above, there is one sub-terminal. However, in other exemplary embodiments, the number of sub-terminals may be greater than one. For example, the following exemplary embodiment is illustrated utilizing two sub-terminals.

Figure 9:
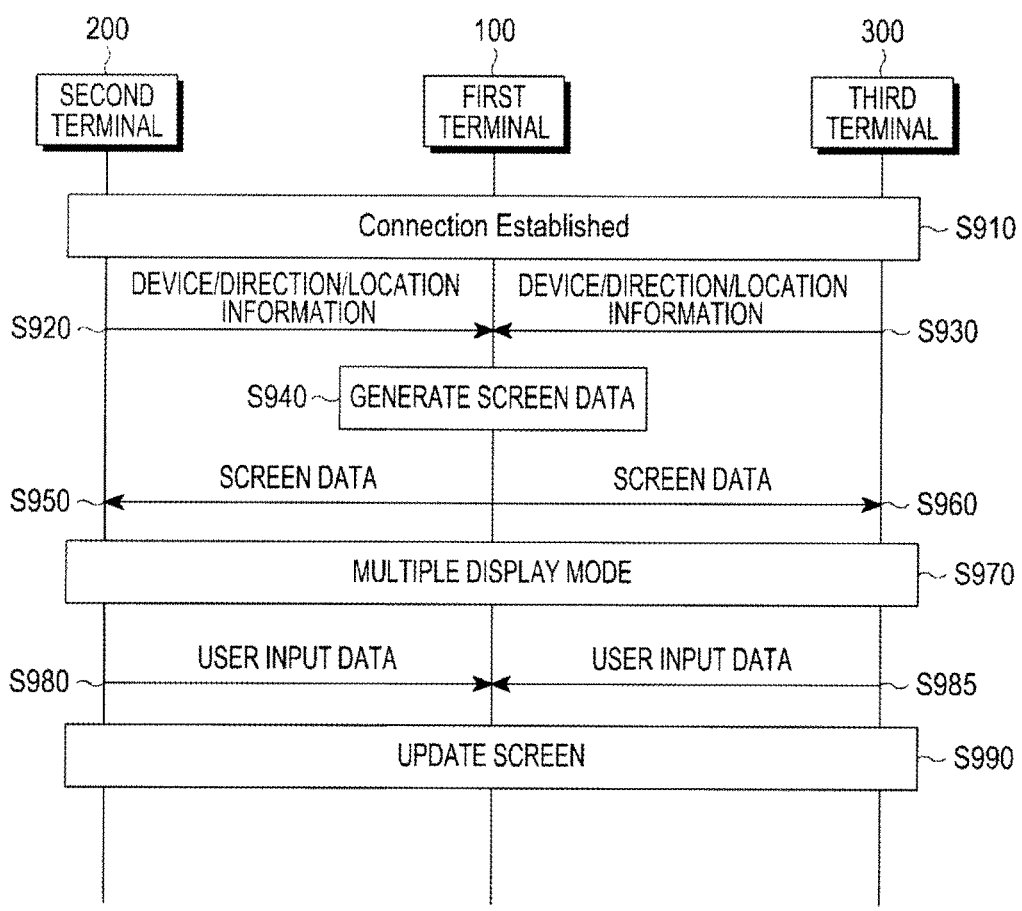
FIG. 9 is a flowchart of the multiple display method, according to another exemplary embodiment of the present invention.

FIG. 9 is the flowchart of the multiple display method, according to another exemplary embodiment of the present invention. Description overlapping with the foregoing will now be omitted. In this embodiment, a third terminal 300 may have the same configuration as that of the second terminal 200.

At step S910, a wireless connection is established among the first terminal 100, the second terminal 200 and the third terminal 300.

At step S920 and step S930, the first controller 160 of the first terminal 100 receives device information, for example at least one of display resolution or size, respective model name and/or the like from each of the second and third terminals 200 and 300 to configure the screen data. The first controller 160 may identify from the device information what types of devices the second and third terminals 200 and 300 are, and which display units they have, which can include size, resolution, construction, etc. Alternatively, the first controller 160 may further receive respective direction (or orientation) information and/or location information of the second and third terminals 200 and 300.

At step S940, the first controller 160 generates the screen data based on at least one of device information, direction information and location information of the second and third terminals 200 and 300.

At step S950 and step S960, the first controller 160 transmits second screen data to the second terminal 200 and transmits third screen data to the third terminal 300.

At step S970, in order to perform a multiple display mode, the first terminal 100 displays its screen based on first screen data; the second terminal 200 displays its screen based on the second screen data; and the third terminal 300 displays its screen based on the third screen data.

At step S980 and step S985, with regard to receiving user input data, the second controller 260 of the second terminal 200 or a third controller (not shown) of the third terminal 300 detects a user input and the first controller 160 receives the user input data from the second or the third terminal 200 or 300.

At step S990, the first controller 160 updates the screen data based on the user input data. Here, the first to third data screens may be updated simultaneously, sequentially, or only one or two of them may be updated.

Figure 10:
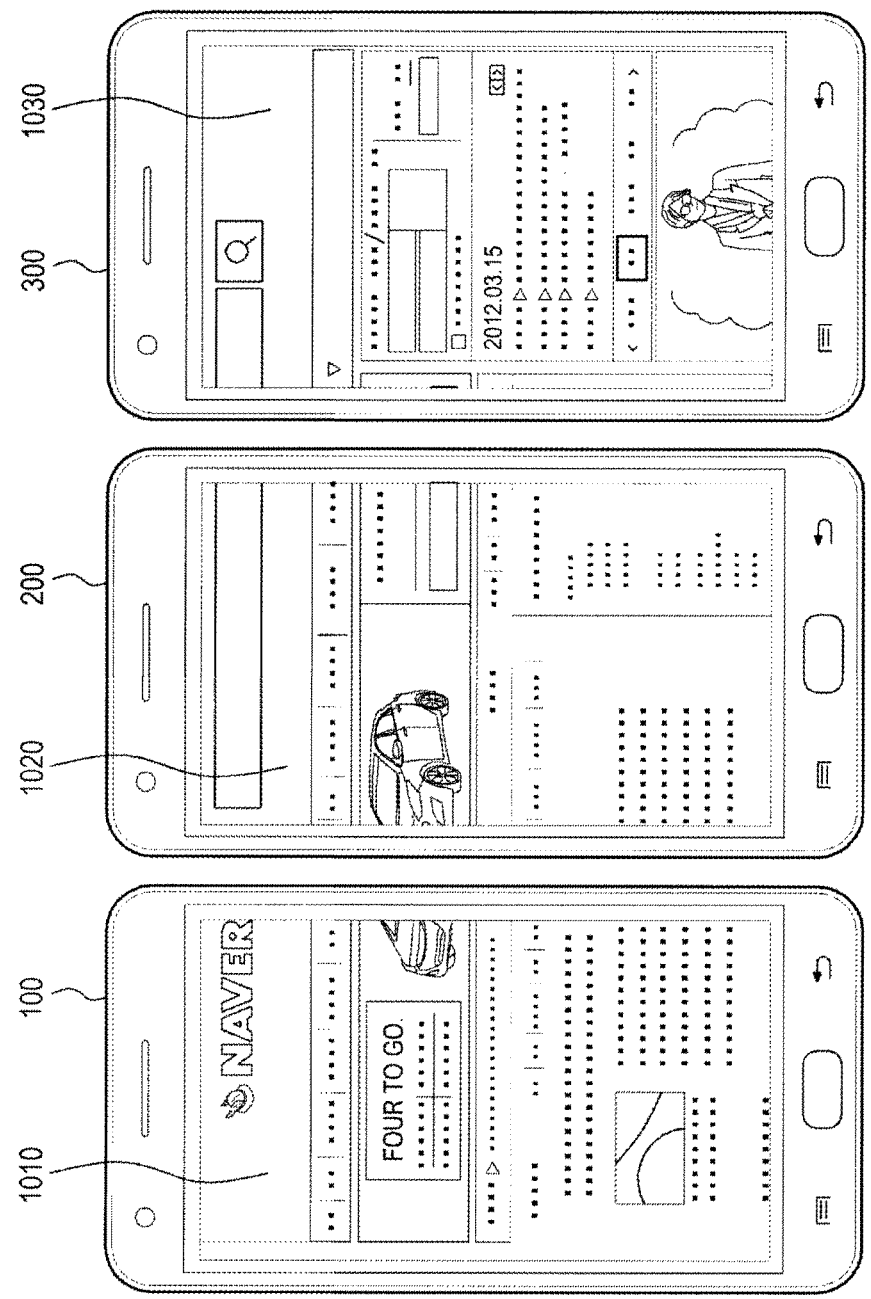
FIG. 10 is a diagram illustrating the multiple display method, according to a seventh exemplary embodiment of the present invention.

FIG. 10 is a diagram illustrating the multiple display method, according to a seventh exemplary embodiment of the present invention.

In FIG. 10, an Internet application window may be divided into first to third screens 1010, 1020, and 1030, the first screen 1010 being displayed on the first terminal 100, the second screen 1020 being displayed on the second terminal 200, and the third screen 1030 being displayed on the third terminal 300.

If the user selects or clicks on an item on the second or third screen 1020 or 1030, the second controller 206 or the third controller detects the user input and transmits the user input data to the first terminal 100. If the user selects or clicks on an item on the first screen 1010, the first controller may detect the user input. The first controller 160 may update the screen data in response to the user input data, divide the updated screen data into first to third screen data, and transmit second and third screen data to the second and third terminals 200 and 300.

The first controller 160 may configure the screen data based on respective location information of the first to third terminals 100, 200, and 300. Specifically, in a case the first to third terminals 100, 200, and 300 are sequentially arranged in the rightward direction, the first controller 160 may divide an Internet application window into first to third screens horizontally and configure the screen data so that the first to third screens 1010, 1020, and 1030 are to be displayed consecutively on the first to third terminals 100, 200, and 300 in the horizontal direction.

Figure 11:
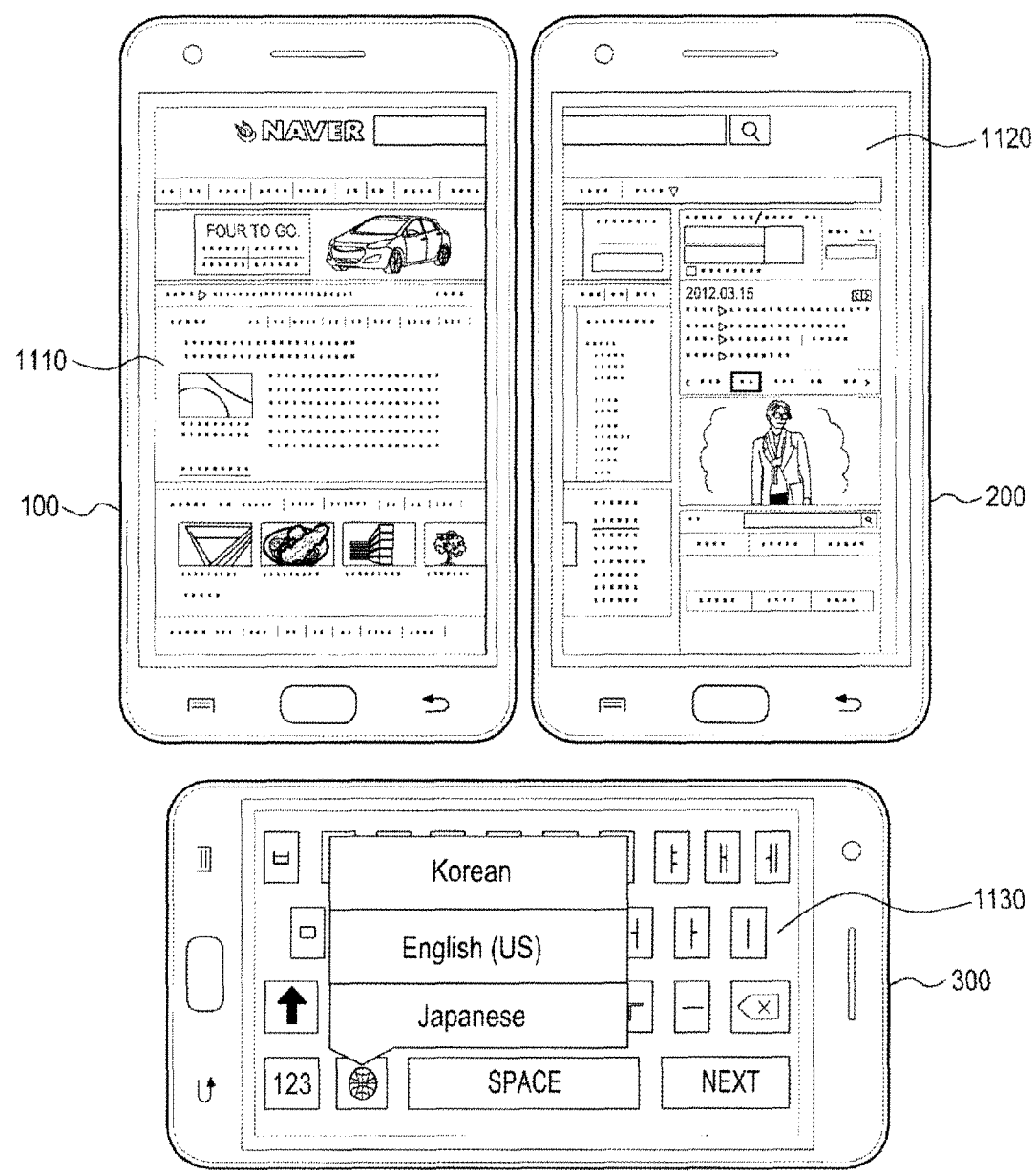
FIG. 11 is a diagram illustrating the multiple display method, according to an eighth exemplary embodiment of the present invention.

On the other hand, as shown in FIG. 11, if the third terminal 300 is arranged under the first and second terminals 100 and 200, the first controller 160 may divide the Internet application window into upper and lower parts, further divide the upper part into first and second screens, and set up the lower part to be the third screen.

FIG. 11 is a diagram illustrating the multiple display method, according to an eighth exemplary embodiment of the present invention.

In FIG. 11, the Internet application window is divided into first and second screens 1110 and 1120, the first screen 1110 being displayed on the first terminal 100 and the second screen 1120 being displayed on the second terminal 200. The third terminal 300 displays the third screen 1130 that represents a text input interface.

Figure 12:
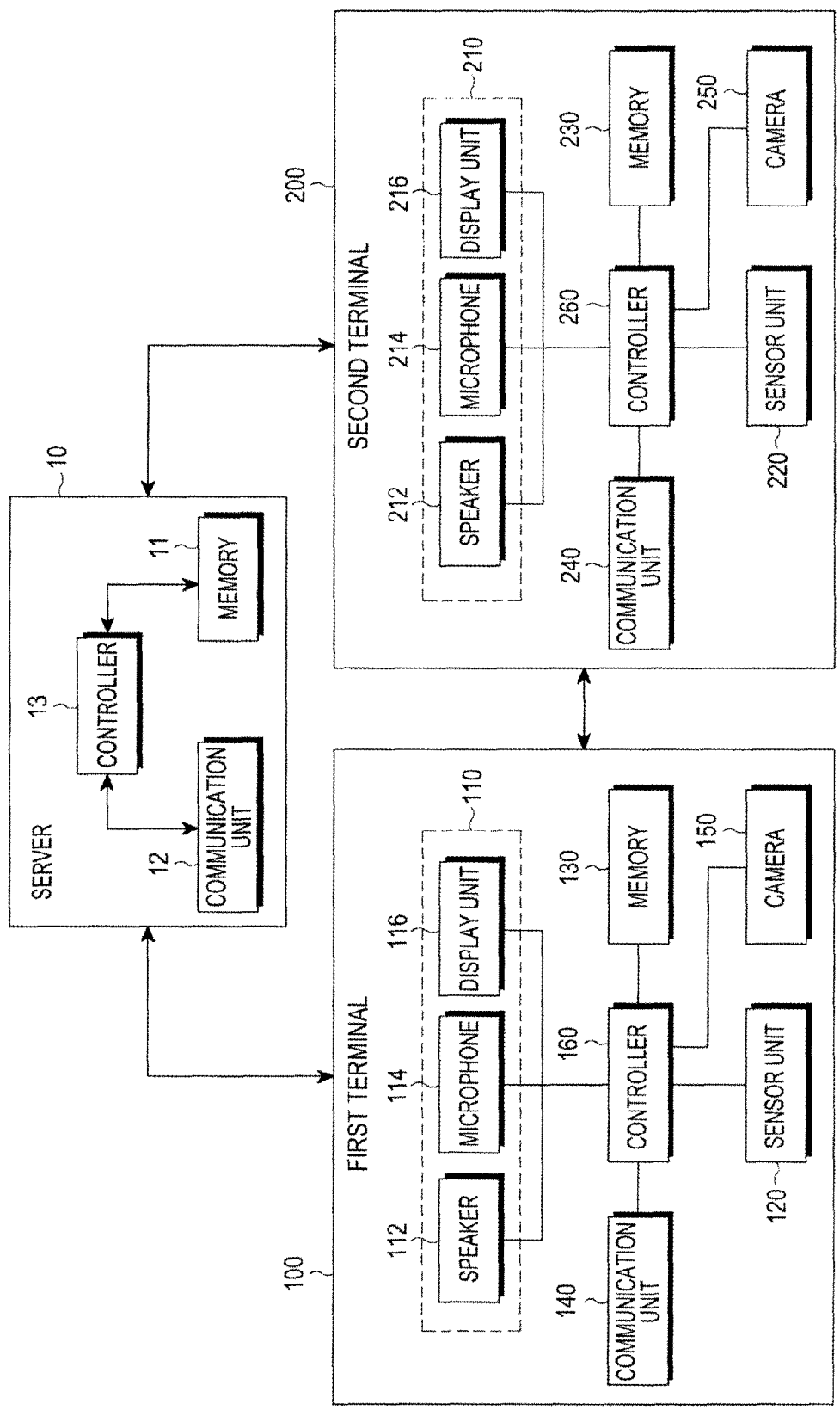
FIG. 12 is a block diagram of the multiple display system, according to another exemplary embodiment of the present invention.

FIG. 12 is a block diagram of the multiple display system, according to another exemplary embodiment of the present invention. The system is different from the system of FIG. 1 in that it further includes a server 10 in addition to the first and second terminals 100 and 200. Thus, description overlapping with the system of FIG. 1 will be omitted, but description focusing on the server 10 is provided.

The server 10 may provide programs and connection information. The server 10 may perform at least one function, for example, of cloud servers, web servers, database servers, etc.

The case where the server 10 provides programs will now be described first.

The server 10 includes a non-transitory memory 11 for storing machine executable code comprising instructions for the first or second terminal 100 or 200 to carry out a multiple display method, update information for updating the programs, etc., a communication unit 12 for performing wired or wireless communication with the first or second terminal 100 or 200, and a controller 13 for transmitting the programs or the update information to the first or second terminal 100 or 200 at the request of the first or second terminal 100 or 200, or automatically.

Next, the case where the server 10 provides the connection information will be described below.

Figure 13:
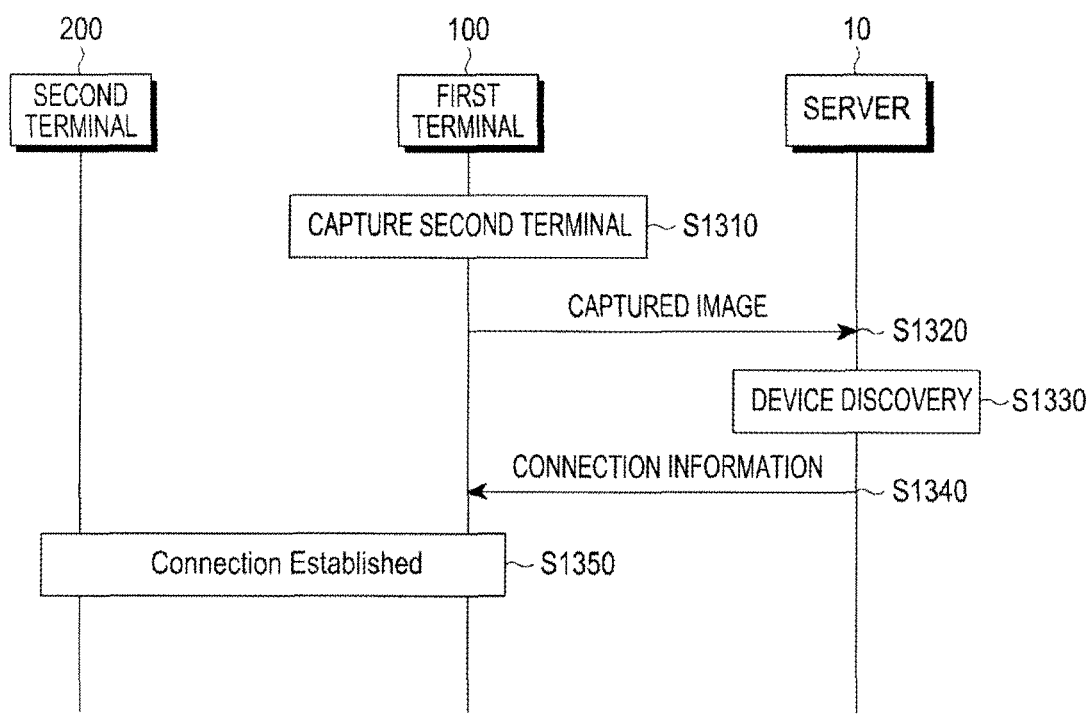
FIG. 13 is a diagram illustrating a function of providing connection information in a server.

FIG. 13 is a diagram illustrating when the server 10 provides the connection information.

At step S1310, the first controller 160 controls the first camera 150 to capture the second terminal 200 in response to a user's command and stores the captured image in the first memory 130.

At step S1320, the first controller 160 transmits the captured image of the second terminal 200 to the second terminal 200 in a form of a message. The message includes identification information of the first terminal 100.

At step S1330, the controller 13 of the server 10 searches for an image that matches a received image from among images of terminals associated with the first terminal 100, which are stored in the memory 11 beforehand, and identifies a terminal corresponding to the matched image. In this example, the terminal corresponds to the second terminal 200.

At step S1340, the controller 13 of the server 10 transmits connection information (e.g., a network identification (ID), a network address, etc.) of the second terminal 200 to the first terminal 100. The connection information may include the foregoing device information of the second terminal 200.

At step S1350, the first controller 160 of the first terminal 100 establishes a wireless connection with the second terminal 200 using the received connection information.

Actions subsequent to step S210 of FIG. 2 may then be followed, but step S220 of receiving the device information may be omitted if the reception of the device information is performed at step S1340.

Embodiments of the present invention provide a device (e.g. communication terminal), apparatus, system and method of providing a larger (e.g. wider) screen to a user of the communication terminal.

It will be appreciated that the exemplary embodiments of the present invention may be implemented in the form of hardware or software, or any suitable combination of hardware and software, for example in which the hardware is configured for operation by executing the software. The software may be stored as program instructions or computer readable codes executable on hardware, for example a microprocessor or processor, on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing a program or programs having instructions that implement exemplary embodiments of the present invention.

The above-described exemplary embodiments (e.g. apparatus and a method of operation) according to the present invention may be implemented in hardware, and optionally in part as firmware or as software or computer code that is stored on a non-transitory machine readable medium, for example a CD ROM, a RAM, a floppy disk, a hard disk, or a magneto-optical disk, or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The terms "unit" or "module" referred to herein is to be understood as constituting hardware such as a processor or microprocessor configured for a certain desired functionality, or a non-transitory medium comprising machine executable code, in accordance with statutory subject matter under 35 U.S.C. §101 and does not constitute software per se.

Several exemplary embodiments have been described, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. A multiple display method performed by a first portable communication terminal, the method comprising:
   establishing, by the first portable communication terminal, a direct wireless connection with a second portable communication terminal;
   receiving, by a transceiver of the first portable communication terminal, device information of the second portable communication terminal directly from the second portable communication terminal;
   determining whether a display of the second portable communication terminal is larger or smaller than a display of the first portable communication terminal;
   generating, by a controller of the first portable communication terminal, both of a first screen data for configuring a first screen of the first portable communication terminal and a second screen data for configuring a second screen of the second portable communication terminal in association with the first screen, based on both of the received device information of the second portable communication terminal and the determination as to whether the display of the second portable communication terminal is larger or smaller than the display of the first portable communication terminal, the first screen data being output by the first portable communication terminal to display an application window; and
   transmitting by the transceiver of the first portable communication terminal, the second screen data to the second portable communication terminal to display, on the display of the second portable communication terminal, the application window in an expanded size when the display of the second portable communication terminal is determined to be smaller than the display of the first portable communication terminal and in a reduced size when the display of the second portable communication terminal is determined to be larger than the display of the first portable communication terminal,
   wherein the received device information of the second portable communication terminal includes characteristics of the display included in the second portable communication terminal and a direction toward which a central axis of the second portable communication terminal is oriented to determine an alignment of the second portable communication terminal with the first portable communication terminal.

2. The multiple display method of claim 1, further comprising:
receiving, from the second portable communication terminal, an input data in relation to the second screen; and
generating by the controller of the first portable communication terminal updated first or second screen data for updating the first screen or the second screen based on the received input data.

3. The multiple display method of claim 1, wherein the first and second screens correspond to different parts of a single application window.

4. The multiple display method of claim 1, further comprising:
receiving, from the second portable communication terminal by the controller of the first portable communication terminal, text input data; and
updating, by the controller of the first portable communication terminal, the first screen data based upon the text input data.

5. The multiple display method of claim 1, wherein the first and second screen data are generated based on at least one of direction, orientation, and location of the second portable communication terminal in addition to the device information.

6. The multiple display method of claim 1, wherein the second screen data includes tilt information regarding the second screen of the second portable communication terminal.

7. The multiple display method of claim 1, wherein the second screen data includes expanding or reducing information of the second screen.

8. The multiple display method of claim 1, wherein the characteristics of the display included in the second portable communication terminal includes at least one of a size, resolution, a model name and a unique identification of a display unit.

9. The multiple display method of claim 1, further comprising:
transmitting, by the first portable communication terminal to a server, a captured image of the second portable communication terminal; and
receiving, by the transceiver of the first portable communication terminal from the server, connection information of the second portable communication terminal,
wherein the wireless connection with the second portable communication terminal is established using the received connection information from the server.

10. The multiple display method of claim 1, further comprising:
detecting by the first portable communication terminal a collision or proximity event that occurs when the second portable communication terminal comes within at least a predetermined distance from the first portable communication terminal,
wherein generating the first screen data and second screen data is initiated by the collision or proximity event.

11. The multiple display method of claim 1, further comprising:
determining whether a user is left-handed or right-handed from device usage history or user settings,
wherein the first screen data and second screen data is generated based on the determination of left-handedness or right-handedness and the device information.

12. The method of claim 1, wherein the first portable communication terminal has an edge and wherein the second portable communication terminal has an edge and wherein displaying the application window in the expanded size when the display of the second portable communication terminal is smaller than the display of the first portable communication terminal and displaying the application window in the reduced size when the display of the second portable communication terminal is larger than the display of the first portable communication terminal comprises displaying the application window to have the same size at the edge of the first portable communication terminal as at the edge of the second portable communication terminal.

13. A first portable communication terminal that provides a multiple display comprising:
a communication unit comprising a transceiver for establishing a direct wireless connection with a second portable communication terminal, the communication unit receiving device information of the second portable communication terminal directly from the second portable communication terminal and transmitting second screen data directly to the second portable communication terminal;
a display for configuring a first screen based on first screen data and displaying as an output the first screen; and
a controller configured for generating the first screen data and second screen data for configuring a second screen of the second portable communication terminal in association with the first screen, based on both of the received device information of the second portable communication terminal and a determination as to whether a display of the second portable communication terminal is larger or smaller than the display of the first portable communication terminal, the first screen data enabling display of an application window,
wherein the received device information of the second portable communication terminal includes characteristics of the display included in the second portable communication terminal and a direction toward which a central axis of the second portable communication terminal is oriented to determine an alignment of the display of the second portable communication terminal with the first portable communication terminal and to display, on the display of the second portable communication terminal, the application window in an expanded size when the display of the second portable communication terminal is determined to be smaller than the display of the first portable communication terminal and in a reduced size when the second portable communication terminal is determined to be larger than the display of the first portable communication terminal.

14. The first portable communication terminal of claim 13, wherein the communication unit receives an input data from the second portable communication terminal in relation to the second screen, and wherein the controller generates updated first screen data or updated second screen data for updating output of the first screen or the second screen based on the input data.

15. The first portable communication terminal of claim 13, wherein the controller controls a camera to capture the second portable communication terminal, transmits to a server an image of the second portable communication terminal, and receives, from the server, connection information of the second portable communication terminal, and wherein the wireless connection with the second portable communication terminal is established using the connection information.

16. The first portable communication terminal of claim 13, wherein further comprising a sensor unit that detects a collision event that occurs when the second portable communication terminal comes within a predetermined distance from the first portable communication terminal with the sensor unit, and wherein the controller generates the first screen data and second screen data upon detection of the collision event.

17. The first portable communication terminal of claim 13, wherein the controller determines whether a user is left-handed or right-handed from a device usage history or user settings stored in a memory, and the controller generates the first screen data and second screen data based on the received device information and the determination regarding the user being left-handed or right-handed.

18. A non-transitory machine-readable storage medium having machine executable code stored thereon when loaded into and executed by a processor performs a display method using multiple communication terminals, the method comprising:

establishing, by a first portable communication terminal, a direct wireless connection with a second portable communication terminal;

receiving, by a transceiver of the first portable communication terminal, device information of the second portable communication terminal directly from the second portable communication terminal;

determining whether a display of the second portable communication terminal is larger or smaller than a display of the first portable communication terminal;

generating, by a controller of the first portable communication terminal, both of a first screen data for configuring a first screen of the first portable communication terminal and a second screen data for configuring a second screen of the second portable communication terminal in association with the first screen, based on both of the received device information of the second portable communication terminal and the determination as to whether the display of the second portable communication terminal is larger or smaller than the display of the first portable communication terminal, the first screen data being output by the first portable communication terminal to display an application window; and transmitting by the transceiver of the first portable communication terminal, the second screen data to the second portable communication terminal to display, on the display of the second portable communication terminal, the application window in an expanded size when the display of the second portable communication terminal is determined to be smaller than the display of the first portable communication terminal and in a reduced size when the display of the second portable communication terminal is determined to be larger than the display of the first portable communication terminal, wherein the received device information of the second portable communication terminal includes characteristics of the display included in the second portable communication terminal and a direction toward which a central axis of the second portable communication terminal is oriented to determine an alignment of the second portable communication terminal with the first portable communication terminal.

* * * * *